Figure 10:
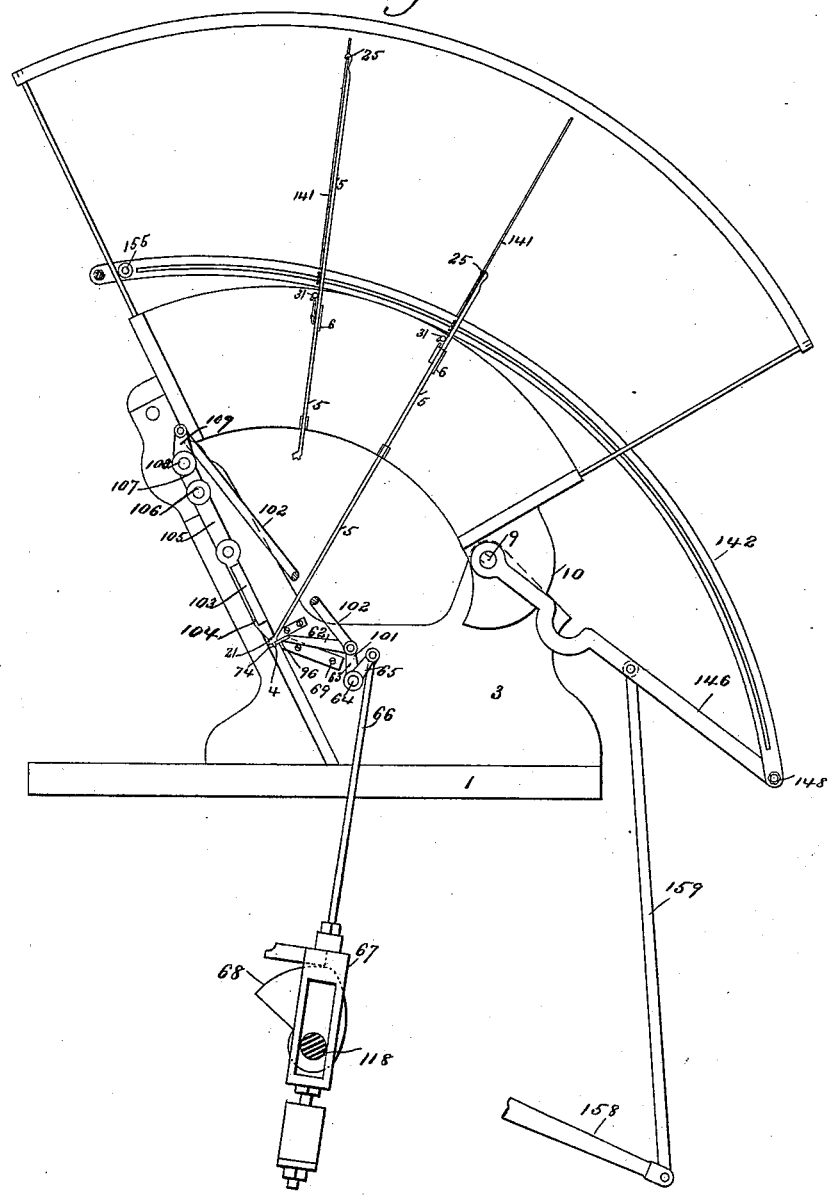

(No Model.) H. LEE & E. LEBRUN. 16 Sheets—Sheet 1.
MATRIX MAKING OR TYPE SETTING MACHINE.
No. 447,134. Patented Feb. 24, 1891.
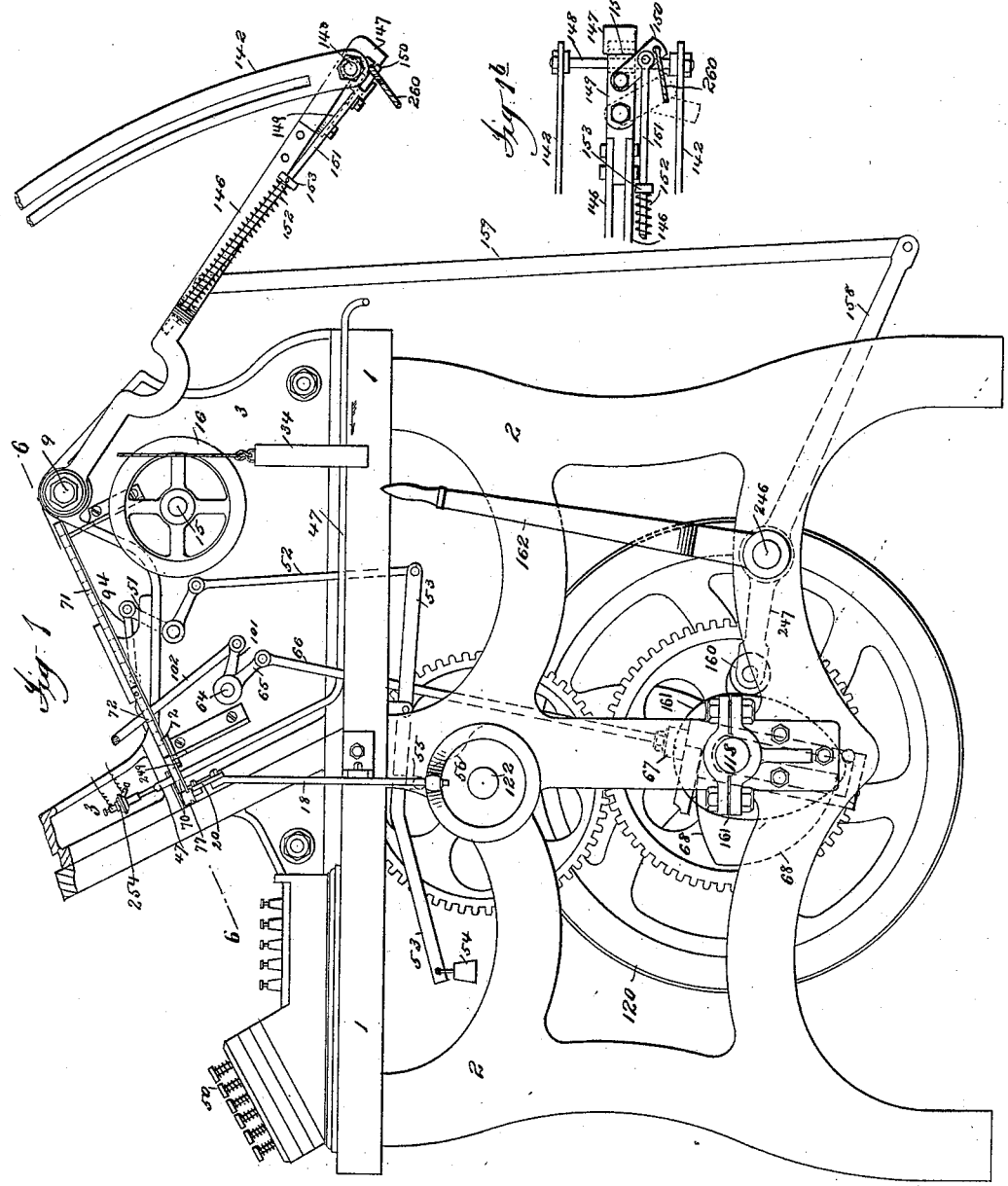

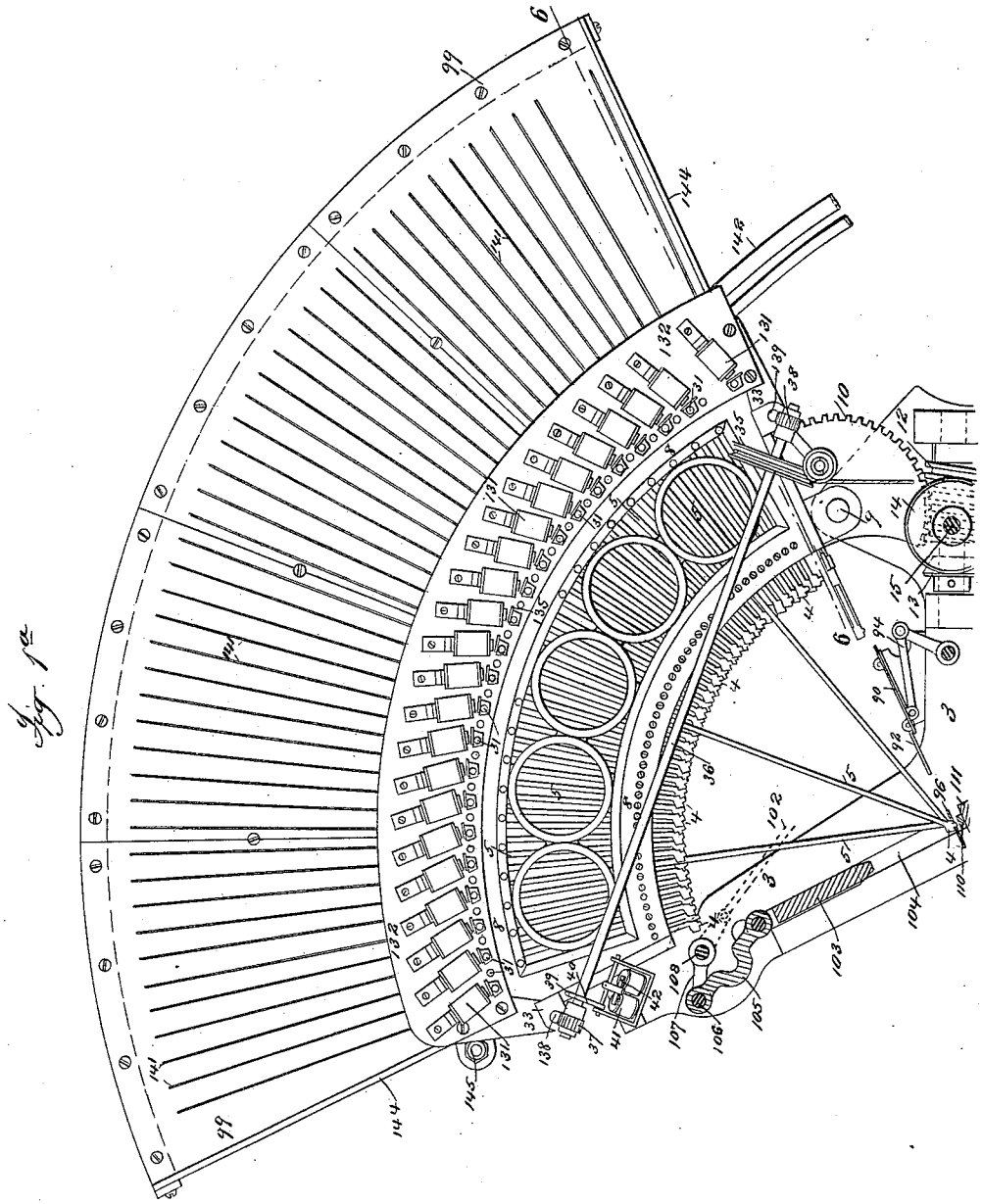

(No Model.) 16 Sheets—Sheet 3.
H. LEE & E. LEBRUN.
MATRIX MAKING OR TYPE SETTING MACHINE.
No. 447,134. Patented Feb. 24, 1891.
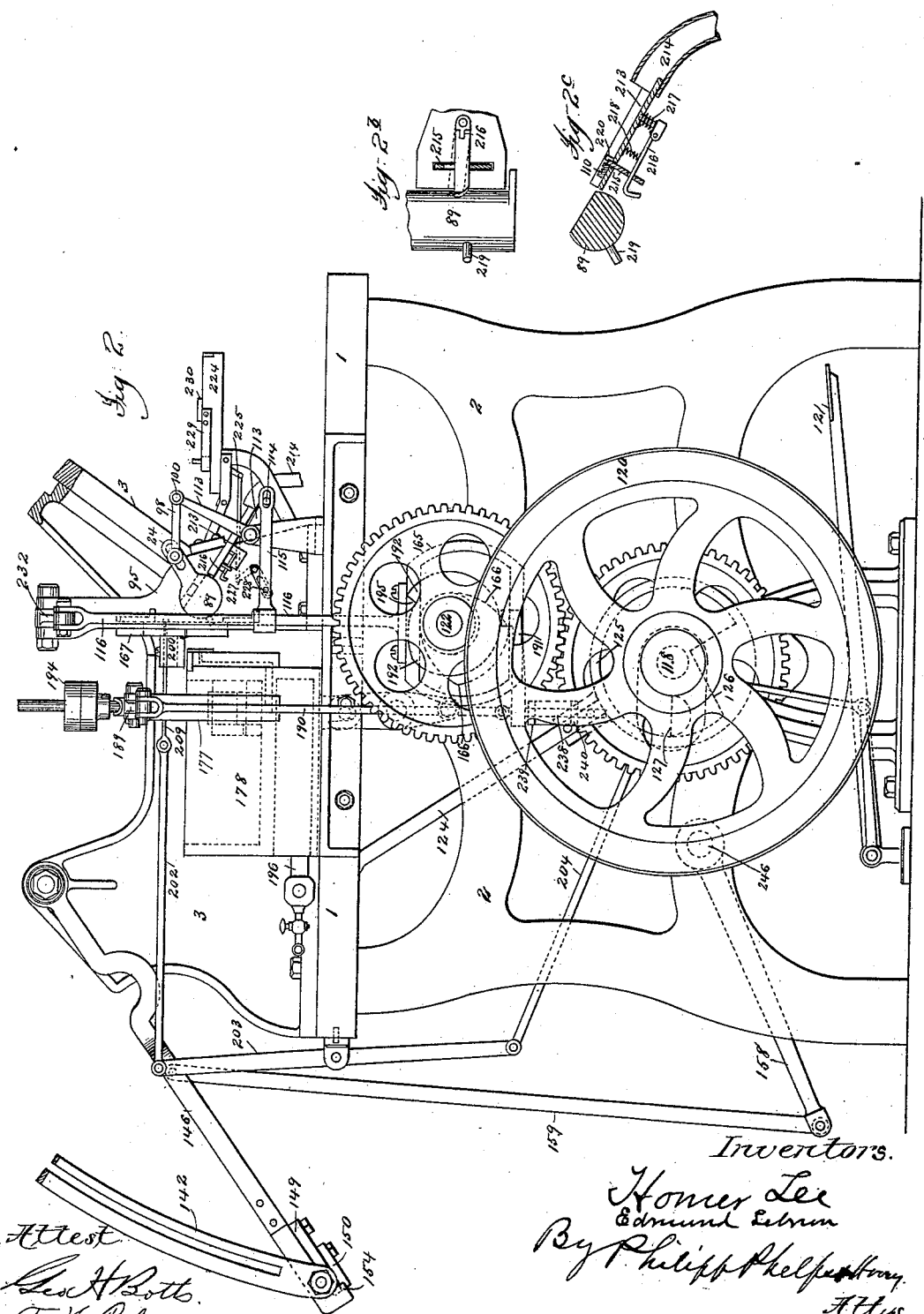

(No Model.)  
16 Sheets—Sheet 4.
H. LEE & E. LEBRUN.
MATRIX MAKING OR TYPE SETTING MACHINE.
No. 447,134. Patented Feb. 24, 1891.
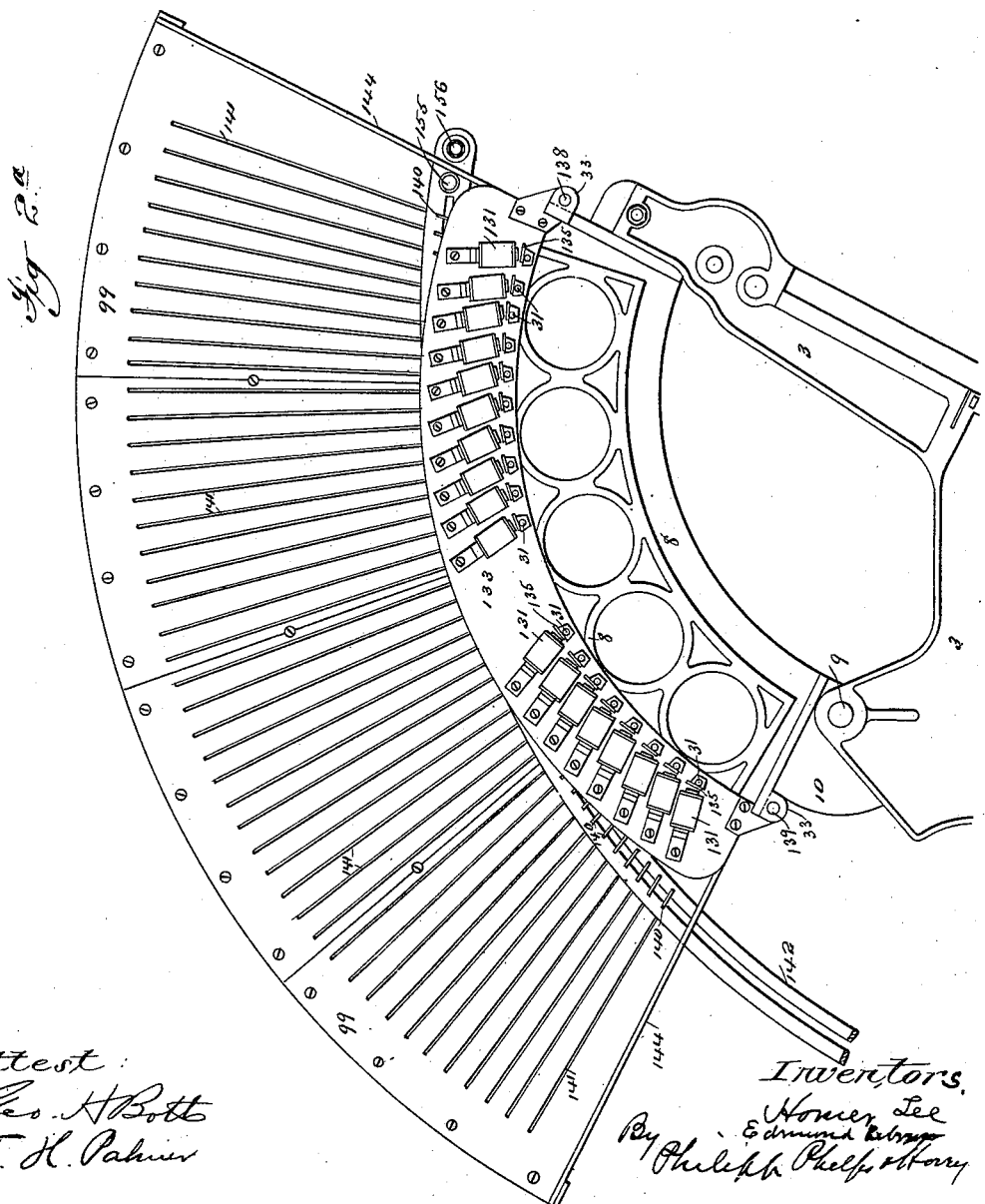

(No Model.)  16 Sheets—Sheet 5.
H. LEE & E. LEBRUN.
MATRIX MAKING OR TYPE SETTING MACHINE.
No. 447,134.  Patented Feb. 24, 1891.
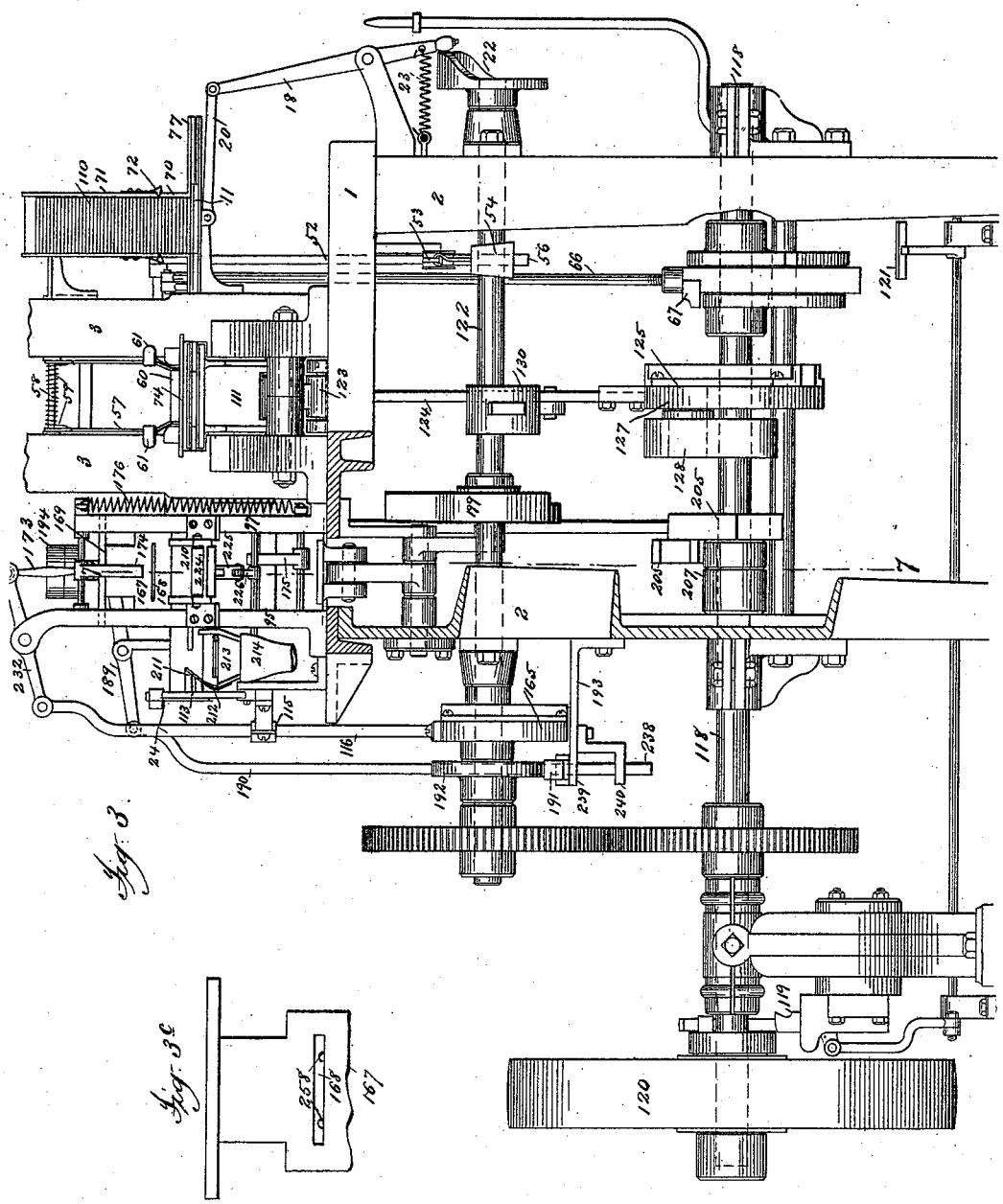

(No Model.) 16 Sheets—Sheet 6.
H. LEE & E. LEBRUN.
MATRIX MAKING OR TYPE SETTING MACHINE.
No. 447,134. Patented Feb. 24, 1891.
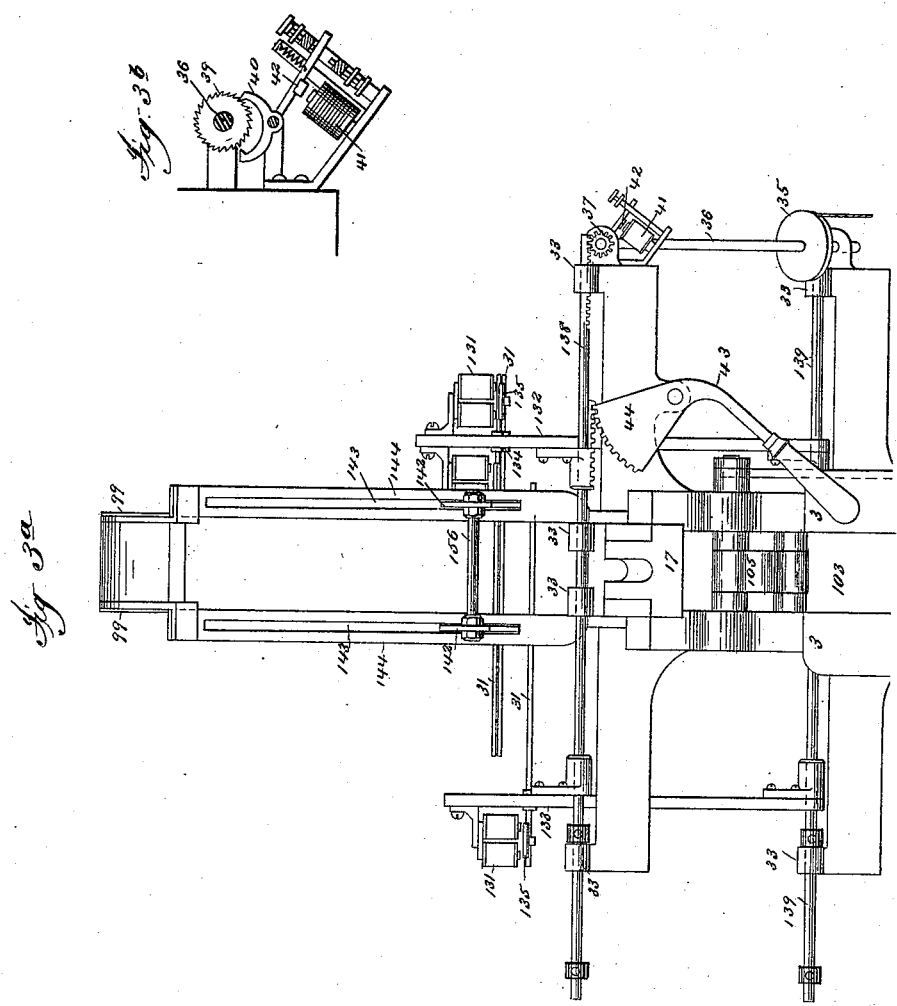
Attest:
Geo. H. Bott
T. H. Palmer
Inventors
Homer Lee
Edmund Lebrun
By Philipp Philps & Hovey
Attys:

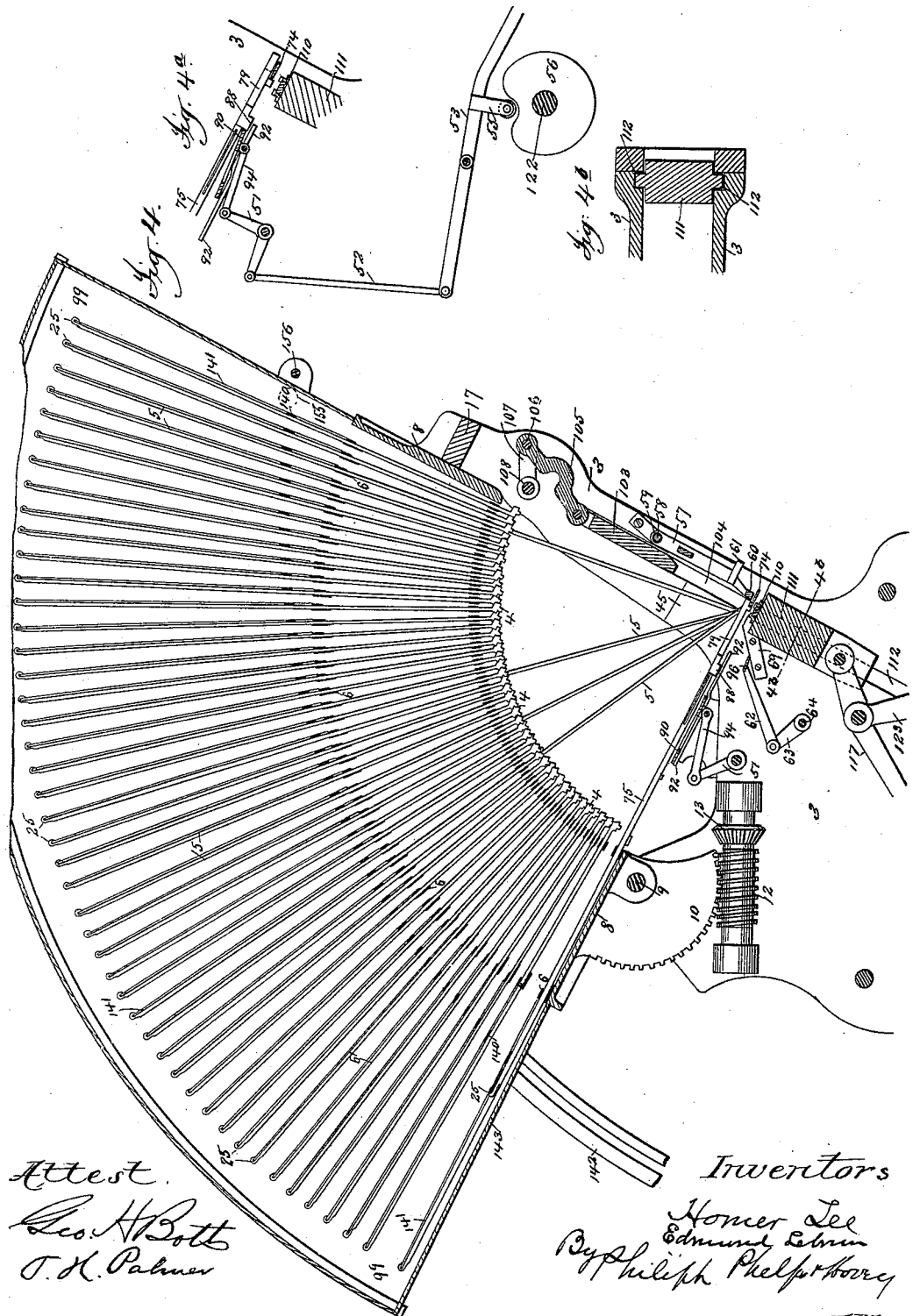

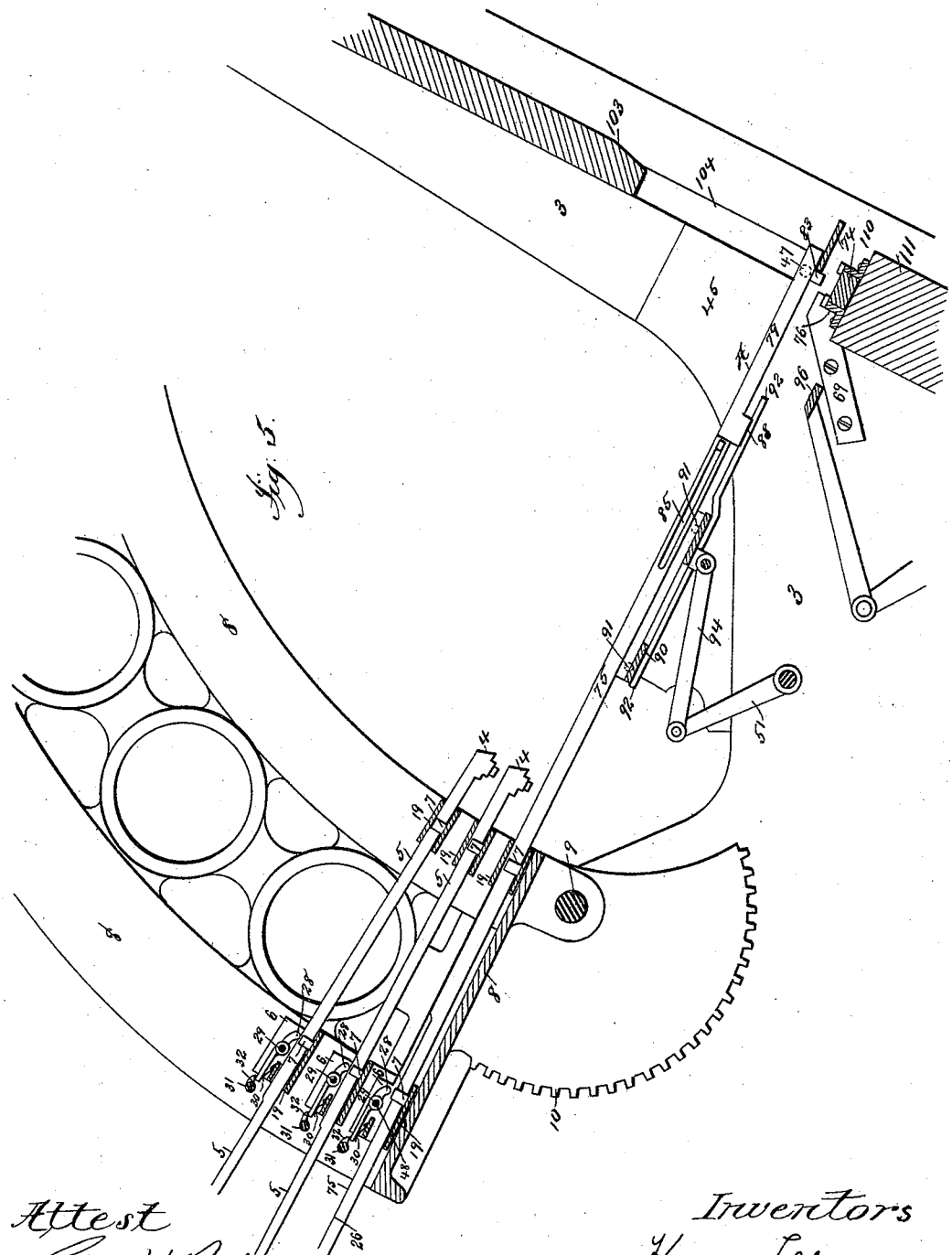

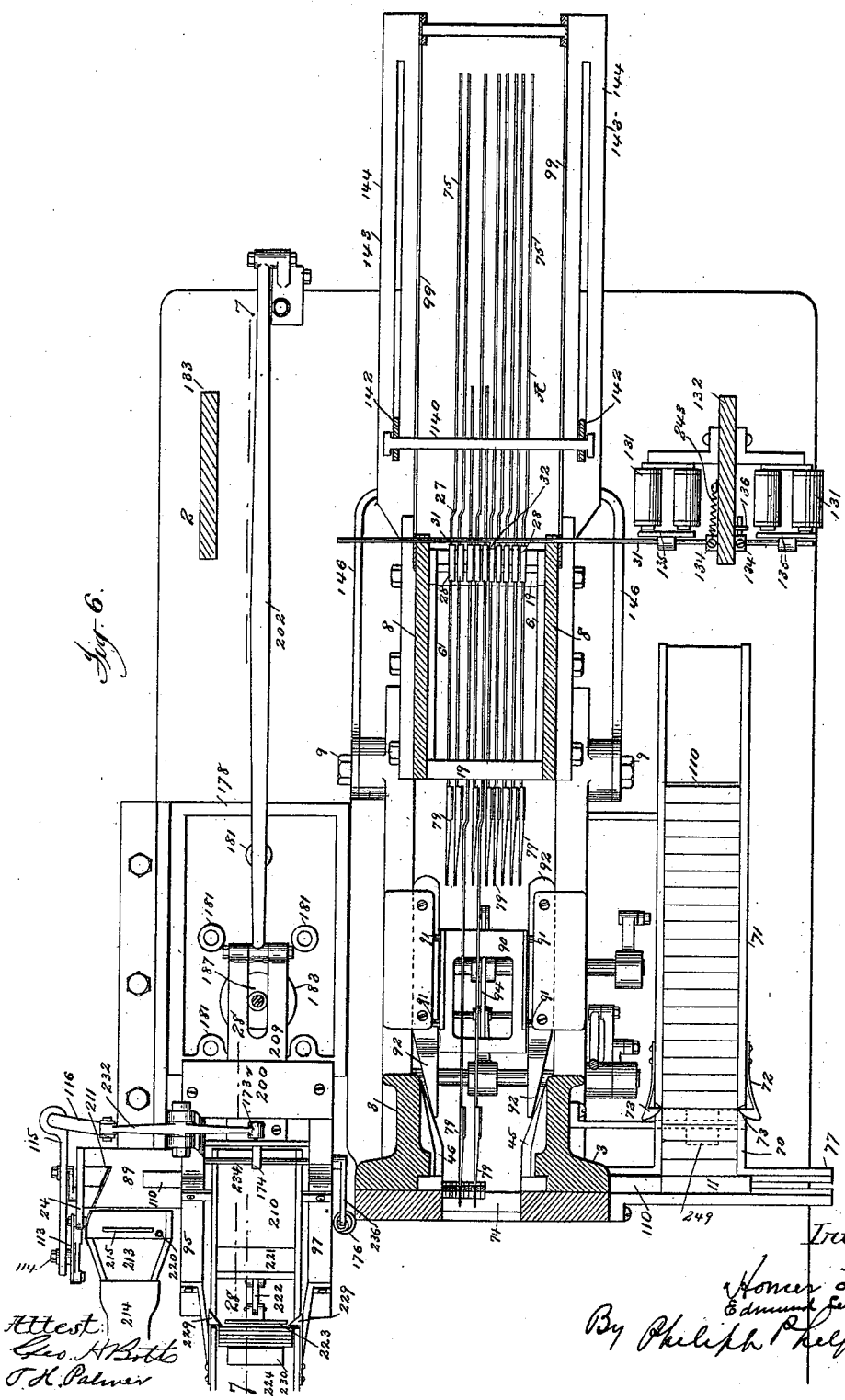

(No Model.) 16 Sheets—Sheet 10.
H. LEE & E. LEBRUN.
MATRIX MAKING OR TYPE SETTING MACHINE.
No. 447,134. Patented Feb. 24, 1891.
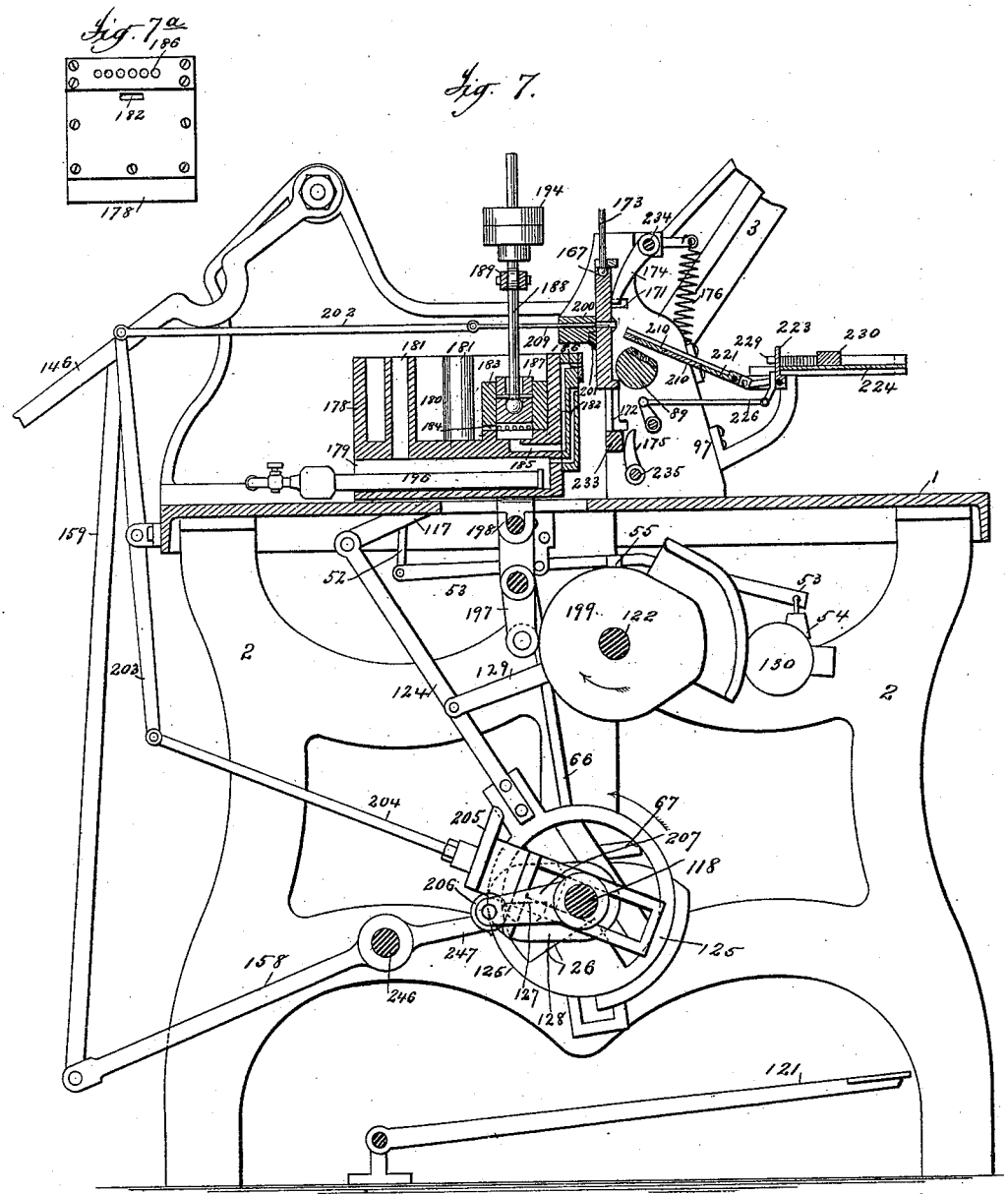

(No Model.) 16 Sheets—Sheet 11.
H. LEE & E. LEBRUN.
MATRIX MAKING OR TYPE SETTING MACHINE.
No. 447,134. Patented Feb. 24, 1891.
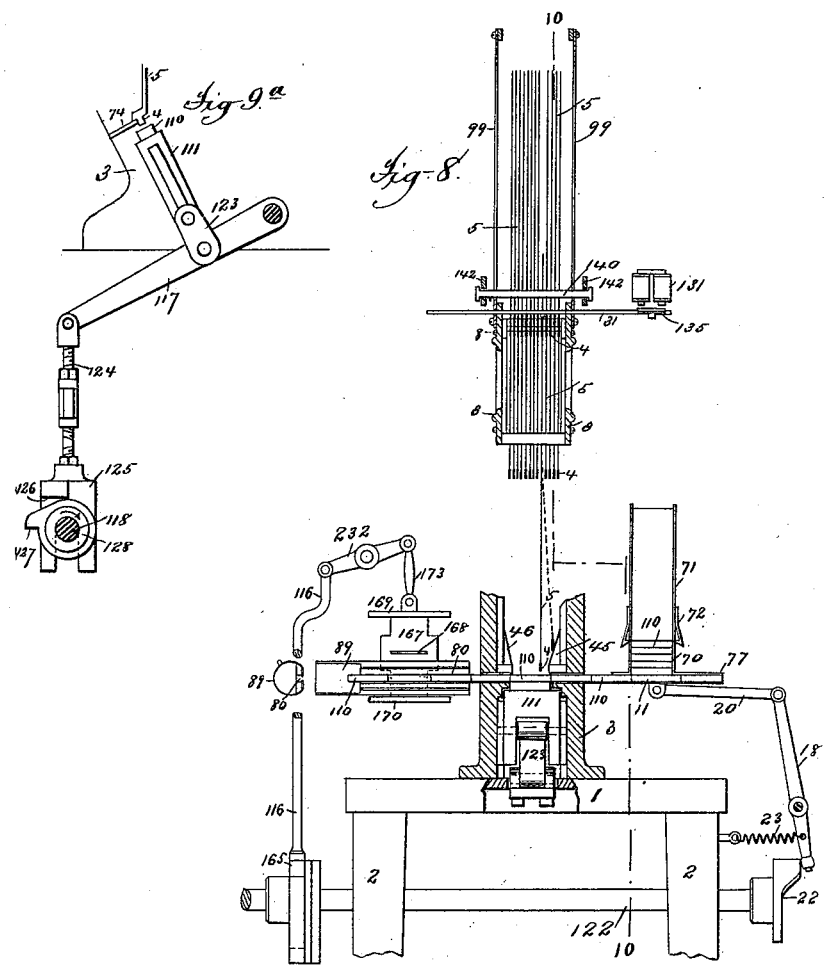
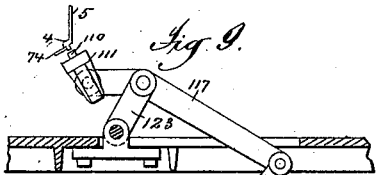
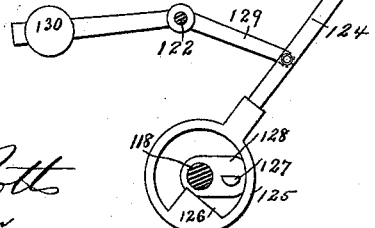

(No Model.) 16 Sheets—Sheet 12.
H. LEE & E. LEBRUN.
MATRIX MAKING OR TYPE SETTING MACHINE.

No. 447,134. Patented Feb. 24, 1891.

Attest:
Geo. H. Bott
T. H. Palmer

Inventors
Homer Lee
Edmund Lebrun
By Philipp, Phelps & Harry
Attys (No Model.) 16 Sheets—Sheet 13.
H. LEE & E. LEBRUN.
MATRIX MAKING OR TYPE SETTING MACHINE.
No. 447,134. Patented Feb. 24, 1891.
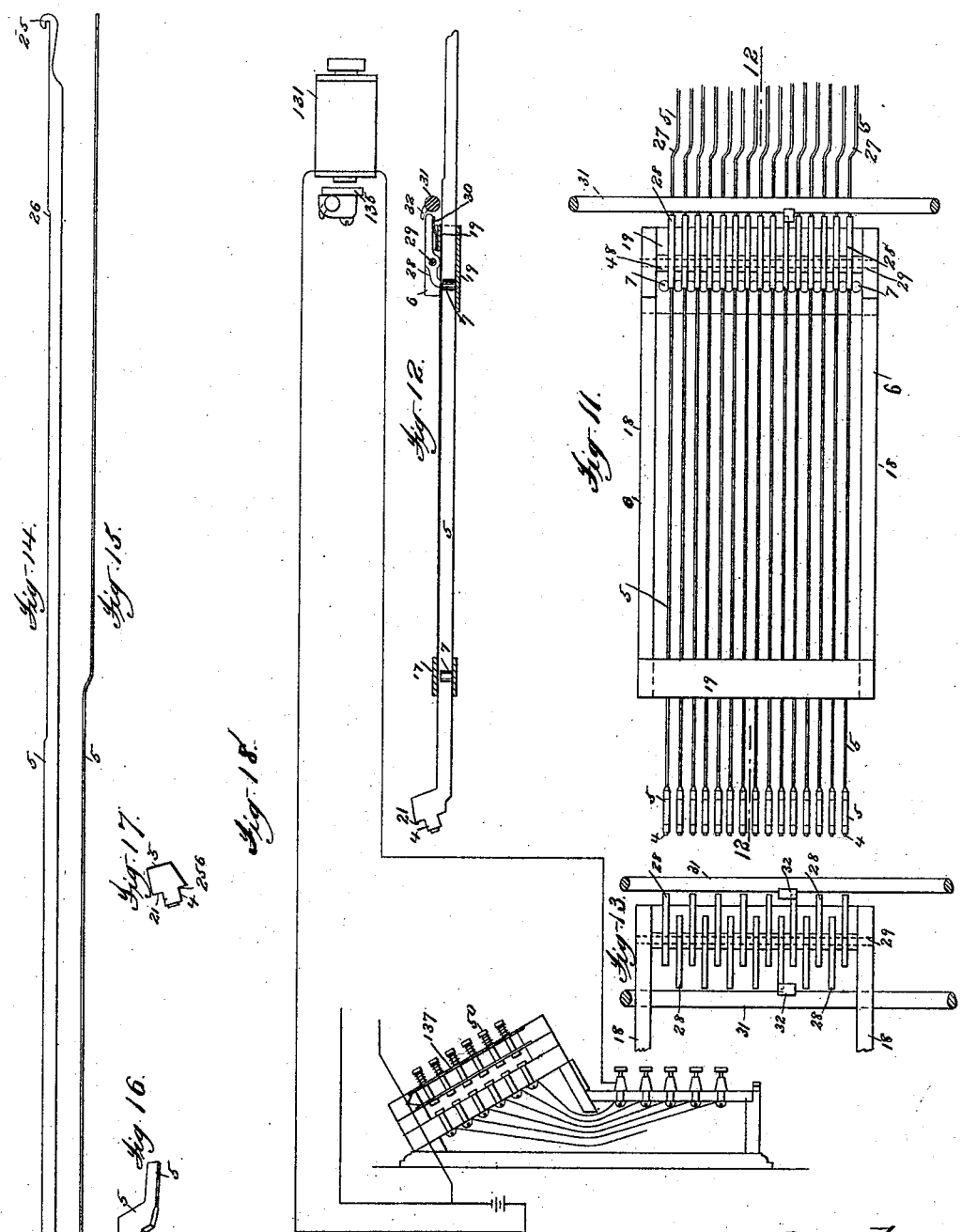

(No Model.) 16 Sheets—Sheet 14.
H. LEE & E. LEBRUN.
MATRIX MAKING OR TYPE SETTING MACHINE.
No. 447,134. Patented Feb. 24, 1891.
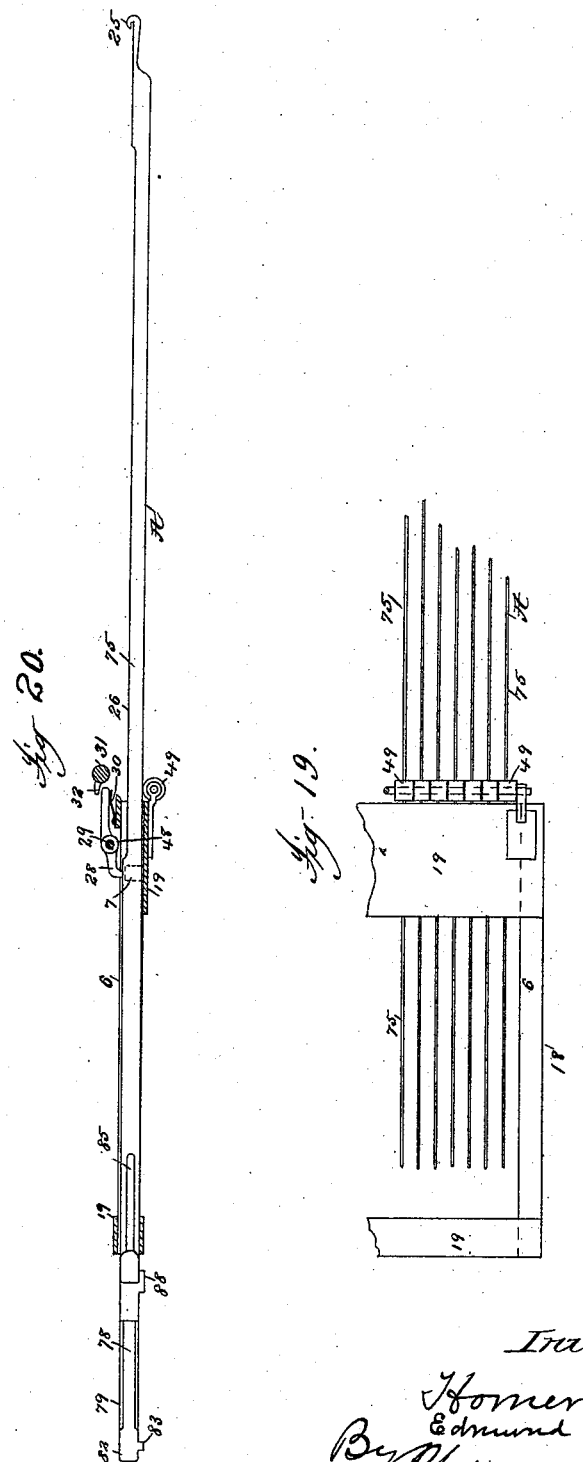
Attest
Geo. H. Bott
J. H. Palmer
Inventors,
Homer Lee
Edmund Lebrun
By Philipp, Phelps & Hoag
Attys.

(No Model.)
H. LEE & E. LEBRUN.
MATRIX MAKING OR TYPE SETTING MACHINE.
No. 447,134. Patented Feb. 24, 1891.
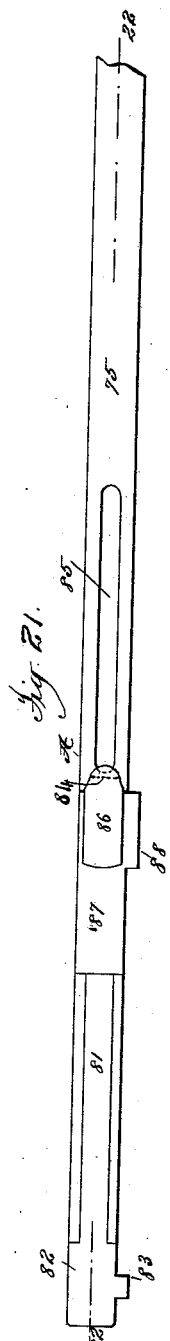
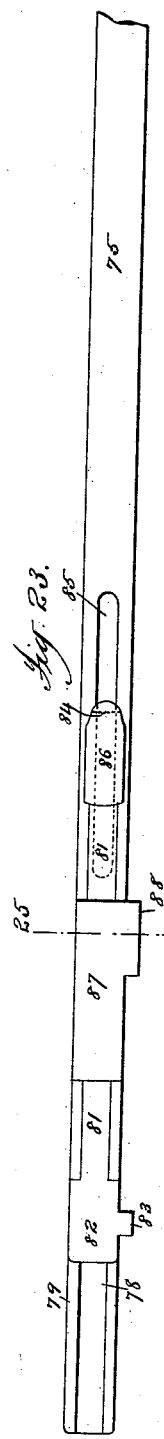
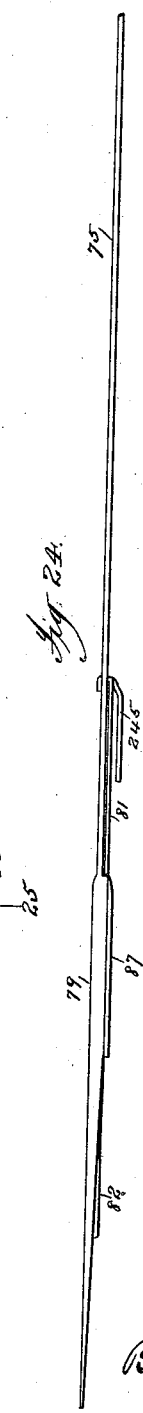
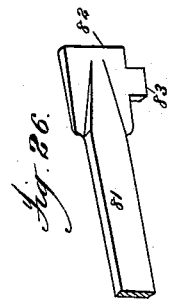

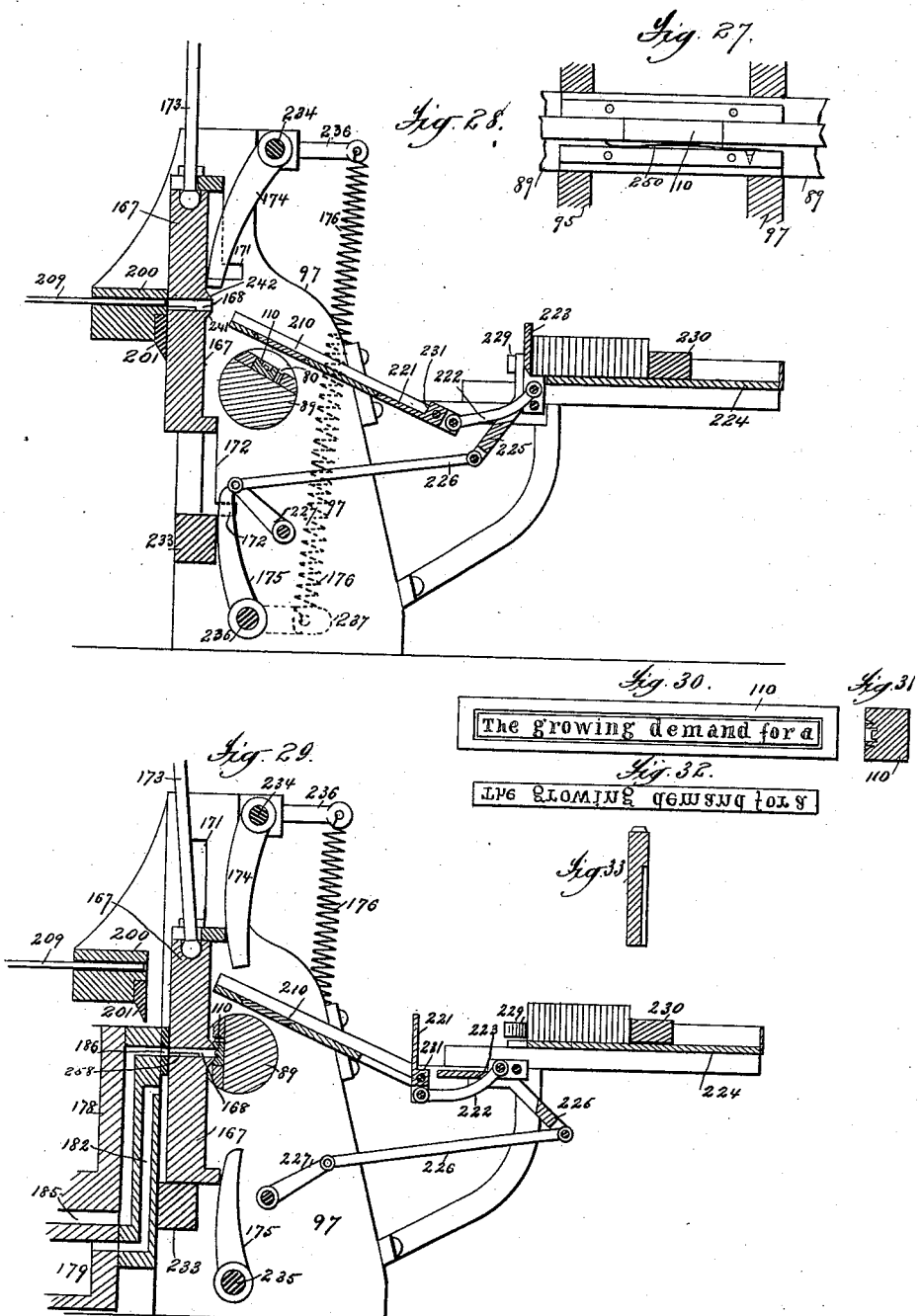

UNITED STATES PATENT OFFICE.

HOMER LEE AND EDMUND LEBRUN, OF NEW YORK, N. Y., ASSIGNORS TO THE ELECTRIC TYPOGRAPHIC COMPANY, OF WEST VIRGINIA.

MATRIX-MAKING OR TYPE-SETTING MACHINE.

SPECIFICATION forming part of Letters Patent No. 447,134, dated February 24, 1891.

Application filed October 31, 1888. Serial No. 289,676. (No model.)

*To all whom it may concern:*

Be it known that we, HOMER LEE, a citizen of the United States, and EDMUND LEBRUN, a subject of the Queen of Great Britain, both residing in the city, county, and State of New York, have invented certain new and useful Improvements in Matrix-Making or Type-Setting Machines, of which the following is a specification.

Our invention relates to that class of matrix-making, type-writing, or printing machines in which a line of type or dies—by which we mean pieces of metal having characters cut thereon either in relief (male) or intaglio (female)—is composed and then used either to print a line of matter or as a die from which to make a matrix, or, if the dies are female, as a matrix from which to cast a printing-bar, and which consists in various improvements upon and additions to the machines of this class heretofore proposed, which we will hereinafter specifically enumerate and describe, and in this description and in the claims we intend to include under the term "type" both male and female dies.

There are several varieties of this class of machines, to all of which some parts of our invention are applicable; but our invention particularly relates to that variety in which each type is fixed upon a separate bar adapted to slide longitudinally in order to bring the type to the composing-space.

To enable the invention, as hereinafter described in detail and claimed, to be more readily understood, a brief statement of the principal parts of the invention and the general character of the mechanism to which it particularly relates will now be given.

Our invention relates in part to mechanism which we have devised for connecting the justifying mechanism with the power-shafting, which gives motion to the type-locking, the impressing, and the matrix-moving mechanisms of the machine, so that the justifying as well as the other necessary operations shall succeed each other automatically and periodically—that is, at recurring intervals in the operation of the machine. We provide also an aligning-block, which is pushed against the type from the rear, so as to wedge them against the rest-bar, and provided with connections to the power-shafting, and we lock the assembled, justified, and aligned type by means of an abutment-block connected with the power-shafting, so that its operation will be automatic and will occur at the proper moment in relation to the operation of the justifying and aligning mechanism. The movement of the impression-table to force the matrix against the type and thus produce the impression of the type thereon is also effected automatically by appropriate connections with the power-shafting of the machine. The distribution of the type after the impression has been secured is effected by means of lifter-bars adapted to engage the type-bars and raise them until returned to their normal positions, these lifter-bars in our machine being provided with a connection with the power-shafting, so that they may be operated automatically at the proper moment.

It will be seen from the foregoing that by our invention we combine in an organized machine mechanism so connected with the source of power that the operations of justifying, aligning, locking, impressing the matrix, and distributing the type shall succeed each other automatically and at proper recurring intervals as the power-shaft rotates.

After the matrix has been produced, and the matrix may be made from wood, paper, metal, or any other material capable of receiving an impression and giving it to the printing-bar—the operation of casting the printing-bar is to be performed. Heretofore this has been done by transferring the matrix to a separate casting mechanism. By our invention we simplify and expedite this process by combining with mechanism for casting the printing-bar mechanism for transferring the matrix from the impression-table to the casting mechanism all in a single organized machine and operated automatically from the power-shafting.

In carrying out our invention we also combine with the mechanism for transferring the matrix from the impression-table to the casting mechanism, mechanism for feeding matrix-blanks to the impression mechanism, and thus introduce the matrix-blanks upon one side of the machine and cause them to be presented successively to the impression and casting mechanism. In the particular form of the machine we have shown, which may be changed without departing from the invention, the impression-table and the holder which receives the matrix and retains it during the operation of casting are so placed and connected that during a portion of each revolution of the power-shaft they form parts of a continuous path or runway, through the whole length of which a succession of blocks abut against each other, whereby the delivery of a matrix-blank to the impression-table, of a prepared matrix-block to the holder of the casting mechanism, and of another block which has given its impression to a printing-bar and is therefore of no further service, to a waste-delivery pipe, is effected at each operation of the matrix-feeding mechanism.

Our invention has for a further object and partly relates to the construction of a convenient and effective mechanism for presenting the matrix to the printing-bar-casting mold, forcing the molten metal into the mold, trimming or cutting the rough edge of the printing-bar after it has been cast, so that it shall be flat and smooth and always "type-high," ejecting the printing-bar from the holder, and, finally, for delivering the completed bar in its proper position to a galley. We accomplish these several results automatically by a combination of mechanisms, which will be hereinafter described in detail, all operated from the single source of power used for driving the machine.

Our invention consists in the construction and combination of the mechanisms devised for the several purposes above mentioned, and in various other features and details of construction hereinafter described at length, and referred to in the claims.

In order that our improvements may be properly understood, it is necessary to describe them in connection with a complete machine of the class referred to. We have therefore shown and described such a machine and have necessarily embraced in the description a number of features which we do not claim as our joint invention.

Referring now to the accompanying drawings, Figures 1 and 1$^a$ form together a side elevation of a machine of our construction, the side represented being that upon the right of the operator as he stands in position for operating the machine, Fig. 1$^a$ representing the upper part of the machine and being partly in section. Fig. 1$^b$ represents the under side of the rear portion of the pivoted arms by which the lifter-bar carriers for distributing the type are operated, and shows the devices for effecting at the will of the operator the connection or disconnection between the said arms and the lifter-bar carriers. Figs. 2 and 2$^a$ taken together represent a side elevation of the machine, the side shown being that to the left of the operator. Fig. 2$^b$ represents on an enlarged scale the under side of the reciprocating holder for the matrix-slugs and the means for operating the spring-detent, which assists in directing their passage out from the machine after they have been used. Fig. 2$^c$ is a vertical section through the mechanism shown in Fig. 2$^b$ and on a like scale. Figs. 3 and 3$^a$ taken together represent a front elevation of the machine. Fig. 3$^b$ represents on an enlarged scale the pawl and ratchet with its governing armature and magnet for controlling the step-by-step movement of the type-bar-delivery mechanism. Fig. 3$^c$ is a front elevation, on an enlarged scale, of part of the mold-plate, showing the ribs in the mold. Fig. 4 is a central sectional elevation of the upper part of the machine, the point of view being on the left-hand side of the plane of the section. Fig. 4$^a$ is a vertical section of the impression-table and the thrust-plate for effecting the justification, and shows in elevation the mechanism for operating the thrust-plate. Fig. 4$^b$ is a section on the line 4$^b$ 4$^b$ of Fig. 4, showing the impression-table and its ribs moving in the guide-slots of the frame. Fig. 5 is a sectional elevation on the same plane as Fig 4, but on a larger scale, and showing details of construction omitted from Fig. 4 for the sake of clearness. Fig. 6 is an irregular horizontal section on a scale somewhat larger than that of Figs. 1 to 4, being taken on about the line 6 6 of Fig. 1, and showing the justifying mechanism and a part of the devices for operating the same. Fig. 7 is a sectional elevation of the lower part of the machine, taken on the line 7 7 of Figs. 3 and 6, the point of view being on the left-hand side of the plane of the section. Fig. 7$^a$ is a front elevation of the casting-box. Fig. 8 is a diagrammatic sectional elevation, on a reduced scale, of the upper part of the machine, taken on an approximately vertical plane passing through the path of the matrix-blocks, intended to illustrate particularly the mechanism for passing these blocks from the galley on the right, where they are placed for introduction to the machine, to the impression-table, where they receive the impression of the type, and thence to the reciprocating holder, by which they are presented to the casting mechanism. Fig. 9 is a side view, on a reduced scale, of the impression-table and the connections for operating the same; and Fig. 9$^a$ represents a modified construction of this mechanism. Fig. 10 is a diagrammatic sectional elevation taken on about the line 10 10, Fig. 8, on a reduced scale, showing the aligning and abutment blocks in the positions which they assume to lock the line of type for the impression and the devices through which these blocks are operated, and showing also one of lifter-bar carriers. Fig. 11 is a view of the upper side of one of the type-bar frames, showing in plan a set of types and type-bars and detents for holding the type-bars in place in the frame. Fig. 12 is a sectional elevation on the line 12 12 of Fig. 11. Fig. 13 is a view from the upper side at the upper end of one of these frames, showing the arrangement of detents and delivery-rods where two sets of type-bars are held in one frame. Fig. 14 is a longitudinal side view of a type-bar, and Fig. 15 is an edge view of the same. Fig. 16 is a perspective view of one of the type and the lower part of the bar. Fig. 17 represents one of the disconnected type to be inserted in the line by the operator. Fig. 18 is a diagram of the electrical connections between the key-board and one of the magnets for operating the delivery-bars. Fig. 19 is a view of the under side of one of the frames carrying justifying or type bars, showing the friction-rollers upon which the bars rest. Fig. 20 is a side view of one of the justifying-bars, showing its frame and detent in sectional elevation. Fig. 21 is a side view on an enlarged scale of the forward end of one of the justifying-bars. Fig. 22 is a section on line 22 22 of Fig. 21. Fig. 23 is a side view of the forward end of a justifying-bar, showing the relative position of the wedge and wedge-plate after the former has been forced forward to effect justification. Fig. 24 is an edge view of the forward end of a justifying-bar, the parts being in the same position as shown in Fig. 23. Fig. 25 is a section on line 25 25 of Fig. 23. Fig. 26 is a perspective view of the wedge-plate. Fig. 27 shows the spring in the cylindrical matrix slug-holder. Fig. 28 is a sectional elevation on the line 28 28 of Fig. 6, showing the position of the parts just before the projection of a printing-bar from the mold into the galley. Fig. 29 is a similar section, showing the position of the parts while the operation of casting the printing-bar is in progress. Fig. 30 is a face view of the matrix-block after it has received an impression from the type. Fig. 31 is a cross-section of the same. Fig. 32 is a face view, and Fig. 33 a cross-section, of the printing-bar cast from the matrix-block shown in Figs. 30 and 31.

Referring now particularly to Figs. 1 to 9, it will be seen that the working parts of the whole apparatus are supported upon a suitable frame-work consisting of a horizontal bed-plate 1 and suitable upright portions 2, this frame-work being arranged so as to bring the apparatus at a convenient height for the operator.

The power for operating the machine is derived from a main shaft 118, mounted in appropriate bearings in the frame-work and connected through a pulley 120 or other gearing with an appropriate source of power. A clutch 119 of suitable construction is preferably placed between the main shaft and the driving pulley and gear, and we prefer to connect this clutch with a treadle, as 121, or hand-lever, by which the application of power to the machine may be controlled by the operator. The style of clutch preferred is one—such as, for instance, the well-known "Bliss clutch"—which, when operated to connect the shaft, will maintain the connection for one revolution only.

Geared to the main shaft is a secondary shaft 122, from which we find it convenient to drive certain parts of the machine, greater compactness being secured than would be possible if all the movements were derived from a single shaft.

Supported upon the bed-plate 1 is a vertical frame-work composed of two plates 3, which are arranged at a sufficient distance apart to afford room between them for the blank strip, plate, block, or slug in which the matrix is formed, this blank being of sufficient width or length to receive the impression of a line of matter of the desired length. Located between the plates 3 is an impression-table 111, which supports the matrix-blank while the impression is being taken. This table is placed at a slight inclination, and is arranged to have a limited vertical movement. For this purpose it is provided at its sides with ribs, which enter and move freely in guides or ways formed in the plates 3. The vertical movement of the table is effected automatically by connections with the main shaft. (Best shown in Figs. 7 and 9.) These connections consist of a lever 117, fulcrumed upon a link 123, pivoted to the bed-plate or to a bracket attached thereto.

To the rear arm of the lever 117 is pivoted a rod 124, to the lower end of which is secured a ring 125, encircling the main shaft and having an internal cam-face 126, upon which operates a semicircular pin 127, carried upon the crank 128, rigidly fixed upon the main shaft 118. The ring 125 is guided in its movements by the usual guide-plates. (Shown in front elevation in Fig. 3.) At each revolution of the main shaft the crank-pin 127 operates through the cam-face 126 to move the rod 124 downward in the direction of its length, and thus cause the impression-table to move upward, bringing the matrix-blank 110 with a short and powerful pressure against the type 4. It will be noticed that the link 123 gives a swinging fulcrum to the lever 117, thus permitting the impression-table to move freely in its guideways. The weight 130 on the forward end of lever 129, pivoted centrally to rod 124 and loosely mounted upon shaft 122 or other fixed center, serves as a counterbalance to the table and causes it to return to its depressed position after having been raised by the action of pin 127.

In Fig. 9ª we have shown a modification of the connections between the impression-table and the power-shaft, in which the lever 117, instead of the link 123, is pivoted to the frame, the link being placed between the lever and the table instead of forming a swinging fulcrum for the lever. We have in this case made the rod 124 adjustable in length, so that the range of movement of the impression-table may be varied. This is a feature of importance, since it is sometimes desirable to increase or reduce the depth of the impression in the matrix-blank for the purpose of effecting a corresponding change in the amount by which the type when cast project from the printing-bars. A turn-buckle is shown as the device by which this adjustability is secured, but any other appropriate device may be substituted therefor.

It is obvious that the mechanism for operating the impression-table may be made adjustable where the latter is hand-operated no less than where it is operated by power.

Located just above the impression-table and extending transversely across the machine between the plates 3 is a fixed rest bar or support 74, against which the type come to rest as they are successively brought into line, and by which they are in part held and supported during the operation of justification and while the impression is being taken, as best shown in Figs. 4, 10, and 4ª.

The type 4, a sufficient number and variety of which are provided to meet the requirements of ordinary composition, are secured to the ends of type-bars 5, formed of slightly-flexible metal. (See Figs. 11, 14, and 15.) The type-bars are arranged side by side in rows in transverse frames 6, in which they are free to move longitudinally. The frames carrying the type-bars are arranged in a radial position with reference to the rest-bar 74, and are supported in a segmental frame 8, located above and at one side of the rest-bar. The frame 8 is composed of a pair of side plates connected together by transverse bars or bolts, and is of suitable width to permit of the introduction and removal of the frames 6 carrying the type-bars. These frames 6 may be supported in the segmental frame 8 in any suitable manner which will allow their convenient removal, and will preferably be held in slots or grooves 6, insuring their accurate adjustment in the segmental frame.

To facilitate the introduction and removal of the frames 6, the frame 8 is hinged to the plates 3, so as to be swung back to a position to afford ready access to its under side. To effect this the frame 8 (see Figs. 4 and 5) is secured at one end to a transverse rock-shaft 9, which is mounted in the plates 3 and carries a segmental gear 10, which engages with a worm on a shaft 12, having a pinion 13, which is engaged by a gear 14 (see Fig. 1ª) upon a second shaft 15, which is provided with a hand-wheel 16, (see Fig. 1,) by which it can readily be rotated. By this means the frame 8 may be swung upward, so as to afford convenient access to the several frames carrying the type-bars. When the frame 8 is in its normal position its forward end is supported upon a cross-piece 17, secured to the plates 3. (See Fig. 4.)

The frames 6 carrying the type-bars are, as has been stated, arranged radially to the rest-bar 74, from which it results that when the bars in different frames are moved downward and forward the type carried by the several bars approach each other and tend to come into line side by side at the rest-bar. By reason of this arrangement it is possible to assemble in a transverse line at the rest-bar type carried by type-bars in any one or more of the frames. In order, therefore, to compose a line consisting of any combination of letters or characters, it is only necessary to have a sufficient number of each of the different letters and characters required distributed in different positions transversely of the machine, so that any letter or character can always be found in some one of the frames at any point transversely of the machine, where it is required in composing the line. This result may be secured by providing as many of the frames 6 as there are letters and characters required in ordinary composition, the entire row of bars carried by each frame being provided with the same letters or characters. It is, however, a well-known fact that in printing some letters and characters are required much less frequently than others, and the machines will contain many more type than are required for common work if full frames of the less common characters are provided. We propose, therefore, to assign two characters to some of the frames, causing the type-bars of the two characters to alternate with each other in position, so that each frame so arranged will carry two sets of type-bars, each set extending transversely from side to side of the machine, but the spaces between the type-bars of each set being double the spaces between the type-bars of the frames, which are restricted to a single character.

The details of the construction of the frames 6 will be hereinafter stated in connection with the description of the justifying-bars, which are provided with a precisely similar frame.

Each of the type has upon its forward end a projecting shoulder 21, (see Figs. 14 and 16,) which, when the type is brought into position in the line, rests upon the rest-bar 74. (See Fig. 10.) The type of all the bars carried by any one of the frames 6—that is to say, the type in each transverse row—are arranged at the same angle with respect to their bars; but this angle varies with the type carried by the bars in the different frames, and is so adjusted that the faces of the type carried by the bars in all of the frames will, when the type are delivered against the rest-bar 74, be parallel with the top of the table 111. The frames 6 carrying the type-bars are so arranged that when the bars are released they will move forward and downward, so as to carry the type into their proper positions against the rest-bar 74 by gravity, aided, it may be, by light spring-pressure. The type-bars are held in position in their respective frames in readiness for delivery by frictional contact with a series of stop levers or detents 28, (see Figs. 5, 11, and 12,) pivoted upon rods 29, located in the upper ends of the frames just above the type-bars, and caused to bear upon the type-bars by means of light springs 30.

The release of the type-bars to allow the type carried by them to fall into position against the rest-bar, as they are required in composing a line of matter, is effected by the partial rotation of delivery-shafts 31, one of which is provided for each of the frames 6. (See Figs. 1$^a$, 2$^a$, 3$^a$, 5, and 6.) Each of the delivery-shafts 31 is provided with a releasing-lug 32, which is so arranged that when the shaft is partially rotated it will impinge against the detent 28 of the type-bar which is to be released, thereby rocking the detent so as to raise it out of contact with the type-bar and thus release the bar and permit it to move forward and downward and carry its type into proper position against the rest-bar.

The delivery-shafts 31 are operated to release the type-bars in the proper sequence by a series of electro-magnets 131, one for each delivery-shaft, mounted upon two plates 132 and 133, placed, respectively, upon opposite sides of the machine. The plate 132 on the right-hand side of the machine carries magnets equal in number to the frames 6, contained in the machine, and these magnets operate one delivery-shaft for each frame 6, the delivery-shafts passing through the plate 132 and turning freely in it, but being held by collars 134, fastened to the shafts upon each side of the plate, so that the plate and its set of shafts move together as the machine is used, as will be hereinafter explained. The plate 133 on the opposite side of the machine carries delivery-shafts and magnets for the second set of characters contained in those frames 6 which are provided each with two sets of characters. Two plates on opposite sides of the machine are used for convenience merely, it being obvious that all the delivery-shafts and magnets might be attached to a single plate. So, also, the magnets and shafts might be differently divided between the two plates than as shown. It is found convenient to use two plates—one on each side of the machine—for the reason that space is thus economized, and, further, that the weight of the magnets and the connected apparatus is thus balanced with respect to the bearings upon which they are supported, and their movement, hereinafter described, is attended with less friction and requires less exercise of power than would be the case if all the magnets were placed upon the same side of the machine.

Each delivery-shaft has upon its outer end an armature 135, placed in suitable proximity to the pole of the corresponding magnet 131. The delivery-shafts are held in their normal positions, in which the lugs 32 are out of contact with the detents 28, by the springs 243, by which they are held against stops 136. Each magnet 131 is connected by a circuit, formed in whole or in part of flexible wire, with a battery and one of the keys of the key-board 137, as shown in Fig. 30. The operator by depressing any selected key of the key-board closes the circuit of the corresponding magnet and causes the armature attached to the corresponding delivery-shaft to be attracted, and thereby operates upon the detent of the corresponding type-bar to cause it to be released. The plates 132 and 133 (see Figs. 1$^a$, 2$^a$, and 3$^a$) are attached to and carried by two rods 138 and 139, which rest and move freely in bearings 33, fixed to brackets attached to the frame of the machine. These rods 138 and 139 constitute, with the plates 132 and 133, a frame or carriage carrying the delivery-rods and their magnets and capable of motion transversely of the machine in order to provide for the transverse motion of the releasing-lugs as a line of type is being set up. This transverse motion is secured by a weight 34, attached to a pulley 35, fast upon a shaft 36, journaled in fixed bearings. This shaft carries two pinions 37 38—one at each end—which mesh with teeth cut in the under side, respectively, of the rods 138 and 139 of the carriage. The weight 34 tends constantly to draw the carriage to the right, and this tendency is resisted by a pawl-and-ratchet device. (Best shown in Figs. 3$^a$ and 3$^b$.) This device consists of a ratchet-wheel 39, attached to the shaft 36, a pawl 40, pivoted to the frame-work, and a magnet 41, controlling the pawl 40 through the medium of an armature 42, fixed to the pawl. This magnet 41 is electrically connected with the battery and one of the keys of the key-board 137, in the manner shown in Fig. 18, for the magnets 131. This mechanism constitutes an electrically-controlled escapement governing a step-by-step movement of the carriage to the right under the pull of the weight 34, but which does not impede the free movement of the carriage to the left. The teeth of the ratchet-wheel 39 are so placed that each energization of the magnet 41 permits a movement of the carriage corresponding to the space occupied by a type-bar in the machine.

Provision is made for returning the carriage to the left after a line of type has been set up, or whenever it is otherwise desirable to move the carriage backward, in a pivoted hand-lever 43, provided upon one end with a toothed sector 44, adapted to engage with teeth formed upon the bar 138, as shown in Fig. 3$^a$. By depressing the long arm of this lever the carriage may be returned any desired distance to the left.

Each type when released by the operator through the energization of the appropriate magnet and the lifting of the detent, descends by gravity and is caused to take a somewhat oblique direction as it descends, by means which will be hereinafter described, so that it reaches the rest-bar 74 at a point near or beyond the right-hand end of the line of type, as shown in broken lines in Fig. 8. Two inclines 45 46 are provided, converging one to each end of the composing-space, (see Figs. 6 and 8,) against one of which the descending type strikes if it tends toward a point beyond the end of the composing-space and by which incline it is guided to the rest-bar. On reaching the rest-bar the type is operated upon by a blast of air or other aeriform fluid conducted under pressure to this point through a tube or equivalent conduit 47. (See Figs. 1 and 5.) The vent of this tube is placed in the upright 3 in line with the type when the latter are upon the rest-bar. The position of this vent is shown in broken lines in Fig. 5. This air-blast blows each type as it falls to the left and causes the type as they successively come to the rest-bar to be closely assembled against the left-hand abutment of the composing-space.

The devices by which the line of type after being composed and justified is locked and aligned previous to taking the impression, the devices by which the matrix-blank is presented in proper position to receive the impression, and the devices by which the subsequent operations of the machine are effected will be hereinafter described. It is desirable at this point, in order to facilitate the understanding of the construction and operation of the justifying mechanism, to give a brief description of the means by which the type-bars are redistributed or returned to their original positions in their frames after the impression has been taken. The type-bars, as will be observed, are made of such length as to project outward beyond the ends of the frames 6, in which they are carried, and it will also be observed that each of the bars is provided at its outer or upper end with a hook 25. The frame 8, in which the frames 6 are supported, is provided with upwardly-extending side plates 99, (see Figs. 1$^a$, 2$^a$, 3$^a$, 4, and 8,) which are connected by suitable tie-rods, and between which the upper ends of the type-bars extend. These plates 99 are provided with radial slots 141, in which move thin metal lifter-bars 140. (See Fig. 8.) The slots 141 are so arranged that each of the lifter-bars 140 lies just above or in front of the row of type-bars carried by one of the frames 6 and in such position that when it is moved upward or outward along the slots 141, in which its ends are guided, it will engage with the hook 25 of any one or more of the type-bars which have been released and have moved forward or downward. The ends of the lifter-bars 140 project through the slots 141 and enter slots formed in a pair of curved lifter-bar carriers 142, which are located outside of the plates 99 and move freely up and down, and also longitudinally, in guides or ways 143, formed in plates 144 at the forward and rear ends of the plates 99, as best shown in Figs. 3$^a$ and 6. The carriers 142 are pivotally connected at their rear ends to a pair of arms 146, pivoted one at each side of the machine and approaching each other at its rear, as shown in Figs. 6 and 1$^b$. These arms are united to a head 147, which has on its under side a recess, in which lies a bolt 148, connecting the rear ends of the two carriers 142, as best shown in Figs. 1 and 1$^b$. The bolt 148 is retained in the recess of the head 147 by a catch 149, pivoted to the head. This catch has on its lower side a lateral projection 150, to which is pivoted a rod 151, the other end of which passes through a hole in the arm 146 and is pressed backward by a spring 152, held between the arm 146 and the collar 153 on the rod 151. (See Figs. 1 and 1$^b$.) The tendency, therefore, of the spring 152 is to push back the catch 149 into its closed position. (Shown in Figs. 1, 1$^b$, and 2.) This catch in the position last mentioned rests at its free end upon a lip 154, projecting forward from the lower face of the head 147, and thus securely attaches the bolt 148, and consequently the carriers 142, to the head 147. When, however, it is desired to disengage the carriers from the head 147, the operator pulls upon a cord 260, attached to the projection 150, the other end of which lies within his reach while operating the machine, and pulls back the catch to the position shown by broken lines in Fig. 1$^b$. The purpose of effecting this disengagement will be stated hereinafter.

The forward ends of the carriers 142 are each provided with a friction wheel or roller 155, which rolls upon the rear face of the corresponding front plate 144. (See Figs. 2$^a$ and 4.) The forward ends of the two carriers are preferably connected in front of the machine by a rod 156. Motion is automatically given to the carriers through the arms 146 by means of a rock-shaft 246, provided with arms 158 and 247, the former connected to the arms 148 by a link-rod 159, (see Figs. 1, 2, and 7.) The arm 247 carries a friction-roller 160 in proximity to a cam 161, fast upon the main shaft 118. Once in every revolution of the main shaft the extended portion of the cam 161 depresses the arm 247, raises the arms 146, and, if the connection is made between the carriers and the head 147, causes the carriers to rise, the forward ends of these carriers being supported and guided by the rear faces of the plates 144, upon which the wheels or rollers 155 travel and ascend as upon an inclined plane. The carriers as they rise move the lifter-bars 140 outward and upward along the slots 141, thereby causing the lifter-bars to engage with the hooks 25 of any of the type-bars that have been lowered, and thus carry the type-bars outward and upward and restore them to their normal position, where they are held by the spring-pressed detents 28 until again released. When the type have been thus distributed, the projecting portion of the cam 161 having passed the roller 160, the arms 146 and the carriers 142 will descend by their weight, assisted, if desired, by a counter-balance, to their original position, thereby moving the lifter-bars 140 inward and downward in the slots 141, so that the type-bars may be permitted to move forward and downward when again released.

It may sometimes be desired to take a number of impressions from a single line of type, and that this may be done it is requisite that the operation of the distributing mechanism should be suspended during as many revolutions of the main shaft as there are extra im pressions desired. To this end the connection between the carriers 142 and the arms 146 is made detachable. The catch 149 being withdrawn so as not to lock the pin 148 to the head 147, the arms 146 are free to move upward and downward without causing a movement of the carriers 142, and the operation of the machine will proceed without distribution of the type until the connection between the arms 146 and the lifter-bar carriers is renewed.

It is sometimes desirable to distribute the type before it would be done automatically by the action of the cam 161—that is, to distribute the type intermediately of a revolution of the main shaft, where, for instance, a mistake has been made in the throwing of a type. To permit this to be done the rock-shaft 246 is provided with a hand-lever 162, which may be used at will by the operator.

The mechanism by which the line of type after being composed is justified preparatory to taking the impression, consists, primarily, of a series of justifiers and justifying-bars, the construction of which, reference being had particularly to Figs. 5, 6, 20, and 21 to 26, will now be described. Each of these bars carries a justifier consisting of two principal parts—viz., a wedge 75 and a wedge-plate 82. The spreading or justifying bars, which form the means for guiding and manipulating the justifying-wedges, are simply extensions of the wedges and are composed of thin pieces of metal, and are of the same or substantially the same length as the type-bars, and are provided at their rear ends with hooks 25, the same as the type-bars. Each of these bars is thickened at its forward end, and this thickened portion is tapered by being inclined upon one side or face, so as to form what we term a "justifying-wedge" 79 upon the end of the spreading-bar. The inclined face of the wedge 79 is provided with a longitudinal channel 78, in which rests a tongue-piece 81, to the forward end of which is secured a wedge-plate 82, which is inclined upon one side, but in the reverse direction to the wedge 79, and is arranged to rest against the inclined face of the wedge 79, with the inclined faces of the two in contact. From this construction it will be seen that whenever the justifying-bar 75 and the wedge-plate 82 are moved one with relation to the other, so as to cause the plate 82 to take different positions along the inclined face of the wedge 79, the combined thickness of the two will be varied, the thickness being increased as the thicker portions of the wedges are brought to bear against the wedge-plate, and vice versa; but it will also be seen that by reason of each of the parts being inclined on one side only and the inclined sides being in contact, the outside faces of the wedge 79 and plate 82 will be parallel in whatever position the wedge and plate take with relation to each other.

The tongue-piece 81 is held and guided in its position in the channel 78 by a cap-plate 87, which is secured to the rear end of the wedge 79. The rear end of the tongue-piece 81 is provided with a head 86, having a cap-piece 84, which moves in a slot 85 in the justifying-bar, and thus limits the movement of the tongue-piece in either direction. The cap 84 is of such a width in the direction lengthwise of the justifying-bar that it can be inserted through the slot 85 when the tongue-piece 81 is held at about right angles to the bar, and it is of such length in a direction crosswise to the bar that when the tongue-piece 81 is returned to its normal position the ends or points of the cap-piece project on each side beyond the slot 85 and catch upon the bar, so as to hold the rear end of the tongue-piece 81 securely to the spreading-bar. The tongue-piece 81 is given a certain amount of spring outward, so that it presses against the cap-plate 87, for the purpose of holding the tongue-piece and the justifying-bar together in the position shown in Fig. 25, until pressure is applied to the bar, as will be hereinafter explained. It should be remarked, however, that it is not essential that this spring be given to the tongue-piece 81, as in many cases the friction of the parts may be depended upon to perform the same function.

The wedge-plate 82 is provided upon its under side with an arresting and locking projection 83, which, when the justifying-bar is released, abuts and rests against the rest-bar 74, and the bars 75 are provided upon their lower edges, and preferably just at the rear ends of the wedges, with shoulders 88, the purpose of which locking projections and shoulders will appear when the operation of the justifying-bars is explained.

To the heads 86 are attached leaves 245, which, when the parts are in their normal position, cover the edge of cap-plate 87, as shown in Fig. 22, and prevent type or justifying bars which drop past a justifying-bar in its advanced position from catching upon the shoulder formed by this edge.

The justifying-bars are arranged side by side in a transverse row in a frame 6, which is supported in the segmental frame 8 in the same manner as the frames carrying the type-bars. The frame 6 is of rectangular form, (see Figs. 11 and 20,) and consists of two side pieces 18, connected at their ends by plates 19, between which the justifying-bars pass, so as to move freely. The justifying-bars are guided in the frames by means of pins 7, which are arranged between the plates 19, and a sufficient distance apart to receive one of the bars between each two of the pins. The frame 6 is provided at its upper end with a rod 29, upon which is pivoted a series of detents 28, corresponding in number to the bars, and arranged to bear upon the upper edges of the bars. The detents 28 are preferably separated by washers 48, and are provided with springs 30, (see Figs. 5 and 20,) by which they are held upon the bars with sufficient pressure to retain the bars in their normal positions in the frame until they are released by the partial rotation of the delivery-shaft 31. As the frame 6 carrying the justifying-bars is the same in construction as the frames carrying the type-bars, the description just given applies equally to the frame carrying the type-bars. Where the frames carrying the justifying-bars are nearly horizontal, so that the action of gravity is likely to be more or less insufficient, the friction of the bars and the frames is reduced by means of friction-rollers 49, attached to the plates 19, and receiving the lower edges of the bars, as shown in Figs. 19 and 20.

We will in this connection describe the construction and operation of the releasing mechanism for the type-bars where two sets of characters are carried in a single frame. This construction is illustrated in Fig. 13, which is a view from the upper side of the upper end of one of the frames and its detents and delivery-rods. The detents are pivoted upon a rod 29, although we may use two pivot-rods 29, one for each set of detents, above and below which are inserted the delivery-shafts 31, carrying the lugs 32, by which the detents are operated. The upper delivery-shaft is attached to the plate 132 on the right-hand side of the machine, and the lower delivery-shaft is attached to the plate 133 on the left-hand side of the machine, as has been before explained. If more than two sets of characters are desired in the same frame 6, a similar construction may be employed, a delivery-shaft being introduced for each set of characters in the frame. It should be noted that the use of several delivery-bars for a single frame is made possible by the application of electro-magnets to their control, mechanical devices for the purpose occupying too much room to permit of such use.

The frame 6, carrying the justifying-bars, is so arranged, the same as the frames carrying the type-bars, that when the justifying-bars are released they will be moved by gravity forward and downward to take their proper places in the line being composed, though in this case, the same as in the case of the type-bars, the movement of the bars may be aided or accelerated by means of light springs provided for that purpose. The portions of the justifying-bars which are provided with the hooks 25 extend rearwardly through the frame 6, as is the case with the type-bars, and are located in such position with relation to one of the lifter-bars 140 that said lifter-bar will engage with the hooks and restore the justifying-bars to their normal position at the same time that the type-bars are restored to their normal position, as already explained.

In order to increase the number of the type-bars which may be operated within a given space, and thus avoid making the machine unduly large, the bars in each of the frames 6 are so arranged that they alternate with those in the adjoining frame or frames. This arrangement of the bars causes the type carried by the bars in each two adjoining frames to slightly overlap each other, and also causes some of the type to slightly overlap the justifying-wedges 79 and wedge-plates 82 of the justifying-bars. As a consequence of this it might happen, when the type and justifying-bars were released, that the type and the wedges 79 and wedge-plates 82, instead of passing into line side by side, would strike against each other and thus be prevented from taking their proper positions in the line. To avoid this, the justifying-bars and the type-bars are bent or deflected laterally so as to form inclined shoulders 27, (see Fig. 11,) which, as the bars are released and pass forward and downward, engage first with the pins 7 at the upper end of the frame, so as to deflect the ends of the bars to the right as respects the operator, or away from the last type brought into the line being composed, and afterward with the pins 7 at the lower end of the frame, so as to deflect the ends of the bars back to the left or toward the end of the line of type. By this means, as each of the type and justifying bars is delivered, its type or justifying-wedge and wedge-plate, as the case may be, is caused to move laterally away from the last type or justifying-wedge and wedge-plate, as the case may be, so as to pass by it and into the line and then move laterally up to the side of the last type or wedge and wedge-plate, so as to be out of the way of the next type and wedge or wedge-plate delivered.

The air-blast and the guiding inclined surfaces 45 46 assist in returning the descending type or justifying-wedges and plates to their positions, and a greater lateral range of movement may be given to the type as they descend, while at the same time they are brought back with more certainty and effectiveness to place upon the rest-bar than would be possible were the action of the shoulders alone relied upon. The shoulder 27 may be of such a depth as to project the type or wedge and wedge-plate diagonally far toward the right-hand side of the machine; but if it strikes anywhere upon the incline 45 it will be directed to the rest-plate, there acted upon by the blast, pushed with certainty to its proper position in the line of type, and there held until the line is completed.

The releasing of the justifying-bars when required for use is effected by means of one of the keys 50 of the key-board 137, from which proceeds a circuit to the battery and a magnet 131, all of which operate in precisely the same manner as the keys, circuits, and magnets for releasing the type-bars heretofore described.

The frame 6, carrying the justifying-bars, is so arranged in the supporting-frame 8 that when any one of the justifying-bars is released and allowed to move forward and downward its forward end will pass just above the rest-bar 74, so that the projection 83 will come into contact with the rest-bar and arrest the justifying-bar. This will bring the wedge-plate 82 and the point of the wedge 79 into position to form the primary space between any two words.

Located just below the justifying-bars and between the frame 8 and the rest-bar 74 is a thrust plate or bar 90, which extends transversely between the uprights 3, and is provided with bearings 91, which are arranged to slide on guides or ways 92, secured to the plates 3. (See Figs. 1ª, 4, 4ª, 5, and 6.) The guides 92 are curved upward as they approach the rest-bar 74, so that as the thrust-plate 90 is moved toward the rest-bar it is raised and brought into position to engage the shoulders 88 on the wedges of any of the justifying-bars which may have been released and advanced into position in the line. By this means and by continuing to advance the thrust-plate after it has engaged with the shoulders 88, the justifying-bars may be advanced so as to cause the wedges 79 to move forward along the inclined faces of the wedge-plates 82, the wedge-plates being held stationary by the projections 83, which abut against the rest-bar, so as to bring thicker portions of the wedges 79 between the type, and thus increase the primary spacing between the words. It is by this means that the justification of the composed line is effected, as will be more fully hereinafter explained when the operation of the machine is described.

The movement of the thrust-plate 90 to push forward the wedges 79 and its retraction after the justification is completed, are effected automatically by connections with the secondary shaft 122. (See Fig. 4ª.) These connections consist of a pivoted bell-crank lever 51, the upper end of which is connected by a link 94 with the thrust-plate 90. The lower end of the lever 51 is connected by a link 52 with a second pivoted lever 53 carrying at its opposite end a weight 54. (See Fig. 3.) This weight, acting through the connections described, has a tendency to push the thrust-plate forward along the guides or ways 92, and would continually hold it in an advanced position were it not for a standard 55 projecting downward from the lever 53 on the rearward side of its pivot, and having at its lower end a friction-roller resting on a cam 56, fixed upon the secondary shaft 122. This cam, which is nearly circular in outline, normally maintains the lever 53 in such a position that the thrust-plate 90 is withdrawn to the rearward position. (Shown in Fig. 4.) A portion of the contour of the cam 56, however, is recessed or cut away, as shown in Fig. 4ª, and when this recessed portion comes under the standard 55 the weighted end of the lever 53 drops, the thrust-plate 90 advances under the stress of the weight, striking against the shoulders 88 and carrying with it the several wedges forming a part of the justifying-bars which have been released, and forcing these wedges forward between the type until the line of type is justified and firmly wedged against the frame-piece 3, against which it abuts at either end. It will be observed that the action of the weight in justifying, although automatic, adapts itself to the size and number of the spaces in the composed line. This automatic adaptation could not be secured if the mechanism for moving the thrust-plate forward was positive in its action, since the extent to which it is necessary to move the justifying-wedges forward depends upon the number of the spaces in the particular line of type which has been set up, and the necessary range of movement of the thrust-plate varies in each case and cannot be predetermined. The use of a weight, however, or its equivalent, a spring, causes the justifying-wedges to be forced forward in each case until they will penetrate the line of type no farther, or, in other words, until the line is properly justified. The recess in the cam 56 should be a gradual curve, so that the action of the thrust-plate will not be too sudden, and at its deepest part it should be deep enough to permit justification of a line containing but one or two spaces. On the other hand, this recess should not be deeper than requisite for this purpose, since it is desirable that the justifying-wedges should be checked after a space of proper width has been secured. Thus if the line being composed extends only half across the column, it is not necessary to fill up the remaining half with quads in our machine as in others, since the blast masses the type sufficiently, and the advance of the justifying-wedges being limited by the shape of the cam 56, or other suitable stop, the half-line may be justified and the impression taken as though the line were full.

As the type drop upon the rest-plate it sometimes happens that they do not strike with precision the position in which the shoulder 21 rests upon the plate. On the contrary, the type itself sometimes falls upon the rest-plate, in which case it has been necessary for the operator to push it back by hand. In order to obviate this inconvenient necessity we propose to introduce a spring-pressed frame, which we term a "gate," between the uprights 3 in the front of the machine. This gate, (see Figs. 3 and 4,) which we have designated 57, is suspended pivotally from a rod 58, supported between the uprights 3, and is pressed inward at its lower end by a spring 59. The lower part of the gate consists of a bar 60, parallel with and just above the rest-bar 74. The tendency to rearward motion of this bar under stress of the spring 59 is limited by the stops 61, attached to the gate, which impinge upon the outer surfaces of the uprights 3 and cause the bar 60 to assume a position such that its inner face will normally be upon the line of the outer edges of the type when in position. The type and justifying-wedges and wedge-plates, therefore, if they do not strike the rest-bar properly as they fall, impinge against the bar 60, throw it slightly outward against the tension of the springs 59, and are returned to their proper positions upon the rest-bar 74 by the reaction of the said springs. The operator can at any time pull out the gate to obtain more ready access to the type upon the rest-bar, if this is for any reason desirable. This gate is of particular service in connection with the justifying-bars, since these bars are heavier than the type-bars and fall with greater force. Moreover, the shock of the fall of the justifying-bar as the projection 83 strikes against the rest-bar tends to cause the justifying-wedge 79 to be pushed forward beyond the wedge-plate, thereby increasing the primary space beyond what it should be. The gate tends to prevent this undue advance of the justifying-wedge, as well as the rising of the wedge and wedge-plate above the rest-bar. When the justifying-wedges are thrust forward, however, by the operation of the thrust-plate, the spring mounting of the gate permits it to yield and it is pushed outward before the wedges.

At 256 in Fig. 17 we have shown an extra type, disconnected from the machine and adapted to be inserted in a line being composed by the hand of the operator. These type are stamped with such unusual characters as it is not convenient to mount in the machine, and are preferably made of such shape that while they will be held upon the rest-bar by the force of the blast and the friction of the adjoining type they will fall by their own gravity from the rest-bar when these retaining agencies are removed.

The mechanism for aligning and locking the type will now be described. The alignment is effected by means of an aligning-block 96 (see Figs. 4 and 10) placed horizontally between the uprights 3 of the frame and fixed upon two arms 62, each of said arms 62 being pivoted to one of two crank-arms 63, fast upon a rock-shaft 64, journaled in the frame-work. This rock-shaft is reciprocated by means of an arm 65 and a rod 66 pivoted thereto, (see Figs. 1 and 10,) the lower end of rod 66 being provided with a head 67, (shown in broken lines in Fig. 1 and full lines in Fig. 10,) embracing the main shaft 118, and actuated by a cam 68, fast on that shaft. Once in every revolution of this shaft the projecting portion of the cam 68 pushes the rod 66 upward in the direction of its length, rocks the shaft 64, thereby causing the arms 63 to approach the rest-bar 74 and push the aligning-block 96 along two guide-pieces 69, upon which it rests, attached one to each inner face of the uprights 3, (one of these guide-pieces is shown in Figs. 4, 5, and 10,) until the aligning-block is brought into contact with the rear faces of the type 4 and the rear faces of the projections 83 of the justifying wedge-plates, as shown in Fig. 10. The type 4 are thus firmly forced and held against the rest-bar 74. Immediately after the line has been thus aligned it is locked in position for the impression by means of an abutment-block 103, (see Figs. 1ª, 3ª, 4, 5, and 10,) which is arranged to move vertically in grooves 104, formed in the uprights 3, and is moved downward to the line of type and there held by means of a crank 109, (see Fig. 10,) the shaft 108 of which has rigidly attached to it two arms 107, at the outer extremities of which is carried a short shaft 106, upon which swings a link 105, which is in turn pivotally connected to the abutment-block 103. Motion is automatically given to the crank 109 by a link-rod 102, pivoted at its lower end to an arm 101, fixed upon the shaft 64.

The devices for feeding the matrix-blanks will next be described, reference being had particularly to Figs. 1, 3, 5, 6, and 8. The blanks are placed for convenient delivery to the machine in an inclined galley 70, placed at the right-hand side of the machine, the upper portion 71 of which is detachable, and is provided with spring-lugs 72, which when the detachable part of the galley is separate from the machine are pressed inward by the springs and prevent the blanks from dropping out; but when the detachable portion 71 is placed in position the lugs 72 are forced outward by the incline 73 on the fixed portion 70 of the galley so that they do not interfere with the downward movement of the blanks 110. The lower end of the removable part 71 of the galley may be held in place by a tenon 249, (shown in full lines in Fig. 1 and in broken lines in Fig. 6,) which enters a recess formed in the bracket which supports the fixed part of the galley. At the lower end of the galley is a horizontal runway 77, adapted to receive a line of abutting blanks and to conduct them through the right-hand upright 3 to the table 111, where they are received when the table is in its depressed position in a continuation of the runway formed by two cleats 76, fixed upon the top of the table. (See Fig. 5.) The matrix-blank is supported upon the impression-table 111 and held thereon by the cleats 76 while the impression is being taken from the assembled, justified, and locked line of type, the table being forced up for this purpose by the action of the devices shown in Fig. 9, which have already been described. The runway 77 is continued beyond the impression-table through the left-hand upright 3 to the casting mechanism. The matrix-blanks are caused to pass automatically from the galley 70 71 through the runway 77 to the impression-table, and this movement is effected (see Figs. 3, 6, and 8) by a plunger 11, fitting and running in the channel 77, to which motion is given by a lever 18, pivoted to the frame-work, the upper end of which lever is pivotally connected by a link 20 with the plunger, and the lower end of which is controlled by an open cam 32, fixed on the secondary shaft 122, against which the end of the lever is held by a spring 23. A closed cam may be substituted for the open cam and spring, if desired. During part of each revolution of the shaft 122 the cam 22 permits the lower end of the lever 18 to be retracted, thereby withdrawing the plunger 11 to the right of the lower end of the galley 70. A matrix-blank is then forced down by gravity into the runway 77. The continued revolution of the shaft 122 causes the projecting portion of the cam 22 to act upon the lower end of the lever 18, forcing the plunger 11 forward in the runway 77 a distance equal to the length of a slug and with it the line of matrix-blanks in the runway. As each slug receives its impression it is forced off from and beyond the impression-table until it is received in a groove 80, formed in the face of a reciprocating cylindrical holder 89, where it remains while the operation of casting the printing-bars is performed.

The runway and the step-by-step movement for transferring the abutting line of blanks through the machine is, as has been suggested, an important part of our invention. It will be noticed that its successful operation requires that each operation of the plunger should move the line of blanks forward a distance equal to the length of one slug, and that the impression-table and cylindrical holder should exactly register with one or more of the blanks, in order that they remove them from and return them to the line without disturbing other blanks in the line; also, the movements of the impression-table and the holder must be so timed as to occur between successive movements of the plunger. We do not limit ourselves to the use of the mechanism described for the transfer of matrix-blocks only. It is obvious that the same devices might be used to transfer printing-bars or for other purposes in machines differently organized.

It is necessary to provide for a slight irregularity in the size of the blocks after they have received the impression, since the pressure to which they are subjected has a tendency to broaden them slightly, varying in different blocks according to the material of which the blocks are made, and also according to the varying density of different blocks of the same material. It is necessary that the blocks when in the holder 89 should be firmly held and in such position that the line of type impressed in it will be presented exactly to the center of the mold. If the runway in the holder were merely made a little wider than the width of a slug before the impression, the block would be held loosely in the holder and the position of different blocks might vary somewhat. To meet these requirements, we propose to insert a spring 250 (see Fig. 27) in that part of the runway opposite to the casting-mold, the yield of which gives a variable width to the runway at that point and holds the block from which the casting is taken firmly against the rear face of the runway.

Before taking up the mechanism employed in casting the printing-bars the operation of the mechanism thus far described will be reviewed. The keys 50, corresponding to the various letters and characters, will be pressed inward by the operator in the order requisite to release the type-bars carrying the desired letters and characters. As each key is actuated the circuit to the corresponding magnet 131 is closed. The corresponding delivery-shaft is rocked so as to cause its releasing-pin 32 to bear upon the proper detent and release the required type-bar. At suitable intervals the operator will press the key controlling the escapement-magnet 41 so as to maintain the proper movement of the frame carrying the delivery-shafts toward the right-hand side of the machine as the composition of the line of type progresses. At each point in the line where a space is required to be inserted between two type the key which operates the delivery-shaft 31 for releasing the justifying-bars will be rocked through the proper key and circuit-connections, thereby releasing one of the justifying-bars and allowing it to move forward and downward until it is arrested by the projection 83 coming into contact with the rest-bar 74. The justifying-bar which is released will by this means be arrested in such position that the wedge-plate 82 and the point of its justifying-wedge 79 will be inserted between two adjoining type, (see Fig. 6,) and will thus form the primary space, corresponding to the primary space always inserted at a corresponding point in the line by the compositor in ordinary type composition. It will be observed (see Fig. 5) that the thrust-plate 90 is so arranged that when in its retracted position the projections 83 and the shoulders 88 of the justifying-bars can pass forward above it, and also that the parts are so arranged that when the justifying-bars are advanced so as to bring their projections 83 against the rest-bar the shoulders 88 will be carried to a position in advance of the thrust-plate.

The projections 83, as has been explained, are upon the wedge-plates 82, which plates are not connected rigidly to the justifying-bars, but to the tongue-pieces 81, which slide freely in the channels 78 in the sides of said justifying-bars. This being the case, it might sometimes happen that the momentum acquired by the justifying-bars in moving forward and downward after they were released would be sufficient to overcome the friction between the justifying-bars and the wedge-plates 82 and their tongue-pieces 81, and thus cause the justifying-bars, when the plates 82 were arrested, to move forward slightly, thus causing the justifying-wedges 79 to move along the wedge-plates before they were brought to rest. This, if it should occur, would bring thicker portions of the wedges 79 to bear against the plates 82, and would thus increase the primary spacing beyond what is desirable or necessary, and would also tend to make the spacing irregular. This, however, is prevented by the spring-pressure of the tongue-pieces 81 against the cap-plates 87, which cause the plates 82 and the tongue-pieces 81 to adhere to the spreading-bars and also by the contact of the forward end of the wedges and wedge-plates with the gate, as above stated.

The keys 50 having been operated until the complete line of type has been assembled on the rest-bar 74, with one of the justifying-bars inserted at each point where a space is required, as just stated, it will be found that in nearly every case the line thus composed will not be of exactly the proper length. In order, therefore, to make the line of the proper length, it is necessary to justify it by increasing the spacing between the words, and, as before explained, it is important that in increasing the primary spacing to effect the justification the increase in spacing should be uniformly distributed throughout the line—that is to say, it is important that each space in the line should be increased to the same or substantially the same extent. This increase in the spacing to effect the justification is accomplished by means of the wedges 79, carried by the spreading-bars. This is accomplished automatically, the operator throwing on the clutch so that the main shaft 118 will be caused to revolve. The weight 55 causes the forward end of the lever 53 to drop when permitted so to do by the recess in cam 56, and the thrust-plate 90 is advanced and forced against the shoulders 88 of those justifying-bars which have been released and advanced. As soon as pressure is thus applied to the shoulders 88 the justifying-bars will be advanced so as to move the wedges 79 along the wedge-plates 82. As the wedges are thus advanced the inclined sides of the wedges, acting upon the inclined sides of the wedge-plates 82, will force the outside faces of the two apart, thereby increasing the primary spacing of the line to effect the justification. It will be observed that in this operation the outer faces of the wedges 79 and wedge-plates 82 remain parallel to each other, so that there is no tendency to twist or distort the type in the line. It will also be observed that the thrust-plate 90 acts upon all of the justifying-bars alike, thereby moving all of the wedges 79 exactly the same distance, so that each primary space is increased to the same extent, thereby leaving the spacing uniform after the justification. The weight continues to force the justifying-wedges forward until in ordinary cases the line of type is firmly wedged against the frame on either side of the composing space, and the wedges can advance no farther, or, where the line is only partly filled with type, until the standard 55 reaches the bottom of the recess in the cam 56. By this means the justification of the composed line is effected automatically, quickly, and perfectly. The further revolution of the main shaft, operating through cam 68, shaft 64, and the connecting-rods, causes the aligning-block 96 and the abutment-block 103 to advance to the line of type and lock them against the rest-bar 74, where they are held while the further revolution of the main shaft, operating through the crank-arm 128, pin 127, lever 117, and the connecting-rods, moves the impression-table vertically, forcing the matrix-blank against the faces of the type and securing an impression. Further revolution of the main shaft withdraws the aligning and abutment blocks, leaving the type and justifying-bars free for distribution, which is effected during each revolution by the action of the cam 161, rock-shaft 246, arm 146, carriers 142, and the connecting mechanism. The type having been distributed, the machine comes to a stop, not to start until the clutch is again thrown. The operator returns the frame carrying the magnets and delivery-bars to its left-hand position, using for that purpose lever 43 and the machine is ready for composing another line of type.

While the operations above followed have been in progress, a matrix-block before imprinted has been forced on by the plunger 11, actuated from cam 22 through the runway 77 to the reciprocating holder 89, which presents the block to the mechanism which effects the operation of casting the printing-bars. (See Fig. 8.) The devices concerned in this operation and that of assembling the printing-bars in a galley will now be described. These parts of the machine are shown in Figs. 2, 3, 6, 7, 8, 28, and 29. The matrix-block on being forced through the left-hand upright 3 by the operation of the plunger 11 enters a groove 80, formed on the flat face of a partially-cylindrical reciprocating holder 89, mounted and adapted to revolve in circular openings in two uprights 95 97, attached to the bed-plate 2 on its left-hand side. This holder projects to the left of the upright 95 and has on its outer end a slotted projection 24, connected by a link 98 and wrist-pin 100 with a bell-crank lever 113, pivoted to the frame of the machine. The lower end of the bell-crank lever 113 carries a pin 114, which is received in a slot in the end of an arm 115, fast upon a rod 116, which has at its lower end a hollow cam-block 165, adapted to be vertically reciprocated by a cam 166, mounted upon the secondary shaft 122. Once in each revolution of the secondary shaft the upward movement of the rod 116, operating through the connections heretofore described, will cause the holder 89 to revolve rearwardly in its bearings (see Fig. 2) until it assumes the position shown in Fig. 29.

The mold in which the printing-bar is cast is an oblong opening 168, cut transversely and centrally in a plate 167 and provided with projecting lips 241 242. (See Figs. 28 and 29.) This mold-plate 167 (shown detached in Fig. 8) has across its top and bottom two bars 169 170, the ends of which enter and move in L-shaped guide-slots 171 and 172, formed in the two uprights 95 97, adapted to guide the mold-plate 167 in a vertical and short horizontal movement. The mold-plate is suspended and its motion directed in these slots 171 172 by a bar 173, attached at one end by a ball-and-socket joint to the upper edge of the mold-plate, and at the other end by a like joint to a lever 232, pivoted to the upright 95, the other end of this lever 232 being pivoted to the upper end of the rod 116, as best shown in Fig. 8. The vertical portions of the slots 171 172 are of a length equal to the vertical throw of the cam 166, so that the vertical reciprocation of the rod 116 will cause the mold-plate to reciprocate between the top and bottom of these slots. A rest-bar 233, its top on a level with the bottoms of the guide-slots 172, is supported between the uprights 95 97 and partially relieves the bottoms of the slots from the blow of the descending mold-plate. Two arms 174 175, attached to two rock-shafts 234 235, journaled in the uprights 95 97 and given a spring-push toward the rear by a spring 176, attached at each end to arms 236 237, fixed upon shafts 234 235, bear upon the mold-plate when in its lower position and tend to push it backward.

Immediately to the rear of the mold-plate (see particularly Fig. 7) is the casting-box 178, in which the type-metal for the printing-bars is melted and from which it is forced into the mold. The casting-box has a fire-chamber 179 in its lower part, just above which is the melting-pot 180, through which pass chimneys 181 for the escape of the products of combustion. A further chimney 182 passes out and up along the front of the box, being thus located for a purpose which will be hereinafter stated.

Centrally in the forward end of the casting-box is a pump-cylinder 183 for forcing the metal from the box into the mold. This cylinder connects by means of apertures 184 near its base with the interior of the melting-pot 180, and by means of a passage-way 185 with a series of small circular openings 186, arranged near the top of the forward end of the box in a transverse line about equal in length to the printing-bar. The pump-piston 187 is connected by a pump rod 188, secured to it by a ball-and-socket joint with a lever 189, pivoted to an upright 177, fixed to and moving with the casting-box. The outer end of the lever 189 is pivoted to a rod 190, which has pivoted to its lower end a pin 238, held vertically in openings in ears 239 240 of bracket 193. (See Figs. 2 and 3.) To the pin 238 is fixed an arm 191, which lies in the path of a cam 192, fixed to the secondary shaft 122. The lower part of the rod 190 and the parts 191 192 238 239 240 are shown in broken lines in Fig. 2. The ears 239 240 serve to hold the arm 191 in the path of its cam, and the pivoted connection of pin 238 and rod 190 permits these connections to follow the casting-box in its reciprocations hereinafter referred to. A weight 194, fixed upon an upward prolongation of the pump-rod 188, presses the pump-piston downward, and is resisted by the pressure of the outer end of the arm 191 against the cam 192. A notch in this cam once during each revolution permits the upward movement of the arm 191 and consequently the downward movement of the piston sufficiently to force the molten metal from the casting-box and through the openings 186.

The casting-box may be heated in any suitable manner, but preferably by means of a jet 196, to which mixed air and gas are supplied through flexible connections. The chimney 182, passing up just outside of the vent-openings 185, aids in maintaining the high temperature of the molten metal up to the time when it passes out of the casting-box. A horizontal reciprocation is given to the casting-box by means of a lever 197, pivoted in the frame of the machine and attached at its upper end by a slot and pivot to a lug 198, projecting downward from the bottom of the casting-box. The lower end of this lever is acted upon by an inclosed cam 199, mounted upon the secondary shaft 122, a reciprocation being given thereby to the casting-box once in every revolution of the secondary shaft. (See Fig. 7.)

The rear surface of the mold-plate 167 as it moves vertically is in contact with a block 200, connecting the two uprights 95 97. To the lower forward portion of this block is attached a knife 201, the edge of which is horizontal and is also in contact with the rear surface of the mold-plate as the latter moves vertically.

Fitted in a horizontal slot in the block 200 is a plunger 209, connected by a link 202, lever 203, and rod 204, with cam-toes 205 operated upon by crank-pin 206, fixed to crank-arm 207 of the main shaft 118. These cam-toes and crank serve, through the connections mentioned, to reciprocate the plunger 209 once during each revolution of the main shaft, thereby forcing the printing-bar from the mold, as will be hereinafter described.

In order to prevent the printing-bar from being drawn backward in the mold upon the retreat of the casting-box, we provide the mold with two or more projecting ribs 258, (see Figs. 29 and 3°,) extending part-way through the mold from the rear end, which will form intaglio grooves in the printing-bar. The forward ends of the ribs being in contact with the metal of the printing-bar will prevent backward motion of the printing-bar, but will not interfere with the forward motion of the bar under the push of the plunger.

The operation of the printing-bar-casting mechanism will now be reviewed. It is assumed that the melting-pot contains a supply of molten type metal at such a temperature as to flow freely. A matrix-block having been forced, as heretofore described, into the channel 80 in the face of the holder 89, and having been pushed to a position directly in front of the mold, the holder 89 is caused by its connections with cam 166 to move backward to the position shown in Fig. 29, and simultaneously the mold-plate 167 by its connections with the same cam is caused to descend to the lower limit of its reciprocation. At the same moment the mold-box is pushed forward by the action of the cam 199, and coming in contact with and pressing against the rear surface of the mold-plate 167 pushes it forward, the ends of the bars 169 170 moving in the horizontal portions of the slots 171 172 until the projecting lips 241 and 242 come into contact and are forced against the matrix-block, the parts then assuming the position shown in Fig. 29. The recess 195 in the cam 192 now permits the pump to operate and force the molten metal into the mold 168. The parts remain in the position shown in Fig. 29 until the cam-path of the cam 199 begins to cause the retreat of the casting-box. Simultaneously the mold-plate is caused by the pressure of the spring 176 to move backward as far as permitted by slots 171 172. Having reached its backward limit of motion, its rear surface rests against the knife 201. The cam 166 now begins to cause the ascent of the mold-plate and as the latter moves upward the rear face of the printing-bar is trimmed by the knife 201, any projecting fragments of metal being cut away and a smooth flat surface left. The upward motion of the mold-plate continues until it assumes the position shown in Fig. 31. The plunger 209 is now forced forward by its crank-pin 202 and pushes the printing-bar out of the mold, causing it to fall upon the incline 210. Meanwhile the holder 89, carrying the matrix-block just used, has been caused to turn forward to the position shown in Fig. 28.

The mechanism for ejecting the matrix-blocks after use and its operations will now be described. The holder 89 being in the position last mentioned, the plunger 11 is caused by its cam to move to the left and carries with it the line of matrix-blocks. Those slugs which have been used are forced on beyond the mold-plate until they strike the incline face of a lug 211, fixed to the face of the holder 89, and by this incline and a spring 212, placed in line with it, the block is diverted downward and forward into the funnel-shaped receiver 213 of a delivery-pipe 214. (See Fig. 3.) To cause the blocks to take a position parallel with respect to the delivery-pipe as they enter it, and thus prevent clogging of the pipe, a spring-catch (see Figs. 2, 2$^b$, and 2$^c$) is arranged in the receiver, consisting of a plate 215, placed transversely and projecting upward through a slot, as shown in Figs. 6 and 2$^c$. This plate is held in its position by a catch 216, which passes through an opening in the plate in which it is free to move laterally and which is doubly pivoted to the receiver, so that it may move both vertically and sidewise. This catch 216 is caused to normally maintain the position shown in full lines in Fig. 2$^b$ by a spring 217. A second spring 218 causes the catch to be normally pushed upward, so that the plate 215 will project above the bottom of the receiver. The rear end of the catch 216 is bent downward and beveled, as shown in Fig. 2$^c$. The holder 89 is provided with a pin 219, which as the holder reciprocates from the position shown in Fig. 29 to the position shown in Fig. 2$^c$ comes in contact with the upper part of the rear end of the catch 216 and moves it downward, so that the block resting on the inclined receiver 213 against the upper part of the plate 215 will be free to move downward. One end of the slug, however, is arrested by a pin 220, so that the block acquires a position parallel with the delivery-pipe, and in this position enters the pipe. The pin 219, having forced downward the catch 216, passes over it, and upon the return movement of the holder 89 the pin 219 strikes the incline or bevel of the catch 216, and pushing it aside to the position shown in broken lines in Fig. 2$^b$ rises above it.

The mechanism for receiving the printing-bars and arranging them in the galley will now be described. The incline 210 has near its lower end a pivoted leaf 221, provided with a shoulder 231 and connected by a link 222 with a leaf 223, pivoted to the printing-bar galley 224. The plate 223 has bolted to it a bracket 225, the upper part of which is cut away so as to form a fork, as shown in Figs. 3 and 29, which fork straddles the link 222. The free end of the bracket 225 is connected by a link 226 with one end of a bell-crank lever 227, provided with a slot which engages with a pin 228 upon the arm 115. The galley 224 is provided at its rear end with spring-catches 229 (see Figs. 6 and 29) for catching and holding the printing-bars as they are presented. The weight 230, free to move in the galley in advance of the printing-bars, serves to keep them upright. The operation of this mechanism is as follows: The printing-bar, which is illustrated in edge front view in Fig. 32 and in section in Fig. 33, is delivered by the plunger 209 to the incline 210 with its face or type-carrying edge downward. It is caused by gravity to descend the incline 210 until it rests at the bottom of the incline against the shoulder 231 of the pivoted leaf 221, and rests there until the descent of the mold-plate and the simultaneous ascent of the rod 116 when the mechanism connecting the rod 116 with the pivoted leaves 221 and 223 is operated, causing leaf 221 to rise to the position shown in Fig. 29 and leaf 223 to descend to the position shown in the same figure, whereupon the printing-bar falls forward upon the pivoted plate 223, its face being toward the rear of the machine. Upon the next descent of the rod 116 the operation is reversed, the leaf 222 rising to the position shown in Fig. 28, introducing the type-bar which it carries, with its type-carrying edge upward, into the galley, forcing the spring-catches 229 apart for that purpose. The catches 229 close behind the printing-bar thus introduced (see Fig. 6) and hold it in the galley, and the leaf 221 drops to the position shown in Fig. 29. It will be noted that the use of two leaves 221 and 223 enables us to reverse the position of the printing-bar and deliver it face up to the galley. If it is not desired to reverse the bars, they may be delivered directly to the galley by the first leaf. Again, the incline may be dispensed with and the bar received directly upon the first leaf.

While we have shown the several parts of our invention as collected and combined in a single machine, we do not limit ourselves to their use in combination only. Many of these parts may be used by themselves, and all of them may be used in machines differing in other respects from that herein described.

The mechanism described for casting printing-bars may be used independently of the rest of the machine or in connection with it, as shown. We desire to claim all the features of this mechanism and of the mechanism for galleying the printing-bars without reference to the construction of that part of the machine employed in giving the impression to the matrix-blank.

Under the term "justifier" as used in the claims we include the wedge and wedge-plate hereinbefore described, and also any other justifying devices capable of use in machines of the class referred to.

In claiming the means for operating automatically the justifying-wedges we do not restrict ourselves to the particular form or construction of wedges which is shown, but intend to claim the operating devices broadly, so far as they are applicable to justifiers of any construction.

In general we do not intend with regard to any part of our invention to limit ourselves to the exact construction of the devices shown, but claim the benefit of all equivalents thereof.

We are aware that it has been proposed to mount the wedges and wedge-plates in justifying mechanisms similar to that shown separately from each other and to advance either the plates or the wedges, or both, in justification, and such a construction and operation of the wedges and wedge-plates are intended to be embraced within these claims, which refer to the actuation of justifiers and wedges.

Certain of the features shown and described in the present application are the sole invention of Mr. Homer Lee, and are described and claimed in a sole application filed by him April 16, 1889, No. 307,469.

The line of division between the joint and sole inventions may be broadly stated as follows: The general construction of the machine, including the feeding, aligning, locking, impressing, casting, and delivering, and many of the special features of this construction are our joint invention and claimed in the present application, while the electrical devices, the incline for directing the type into the composing-space, the blast, the special leaf construction of the justifying-bar, the means for duplicating, the means for distributing independently of the shaft, and the alarm are the sole invention of Mr. Lee and claimed in the specification above referred to. For the exact line of division, however, reference must be had to the claims in the two cases.

We are aware of the applications of Jacobs W. Schuckers, No. 157,204, filed February 27, 1885, and No. 219,263, filed November 18, 1886, and we do not claim any matter contained therein, the machine shown as embodying the present invention having been designed and the invention made with knowledge of the machine of the Schuckers applications.

We do not claim herein the special means for aligning and locking the assembled type, nor the mold-plate of our special construction and operation, as these form, respectively, the subject-matter of separate applications, Nos. 367,806 and 367,807, filed October 11, 1890.

Having thus described our invention, what we claim is—

1. In a machine of the class referred to, the combination of a row of type and type-bars, said row containing two or more sets of bars carrying different characters, a delivery-shaft for each set of bars, and mechanism for operating the delivery-shafts to release selected bars, substantially as described.

2. In a machine of the class referred to, the combination of a row of type and type-bars, said row containing two or more sets of bars carrying different characters, delivery mechanisms, one for each set of bars, a series of keys, and connections between said keys and delivery mechanisms for operating the delivery mechanisms to release selected bars, substantially as described.

3. In a machine of the class referred to, the combination of a row of type and type-bars, said row containing two or more sets of bars carrying different characters, delivery mechanisms, one for each set of bars, and electro-magnetic devices for controlling the delivery mechanisms to release selected bars, substantially as described.

4. In a machine of the class referred to, the combination of a row of type and type-bars, said row containing two or more sets of bars carrying different characters, a delivery-shaft for each set of bars, and an electro-magnet and circuit-connections for operating each shaft to release selected bars, substantially as described.

5. In a machine of the class referred to, the combination of a row of type and type-bars arranged transversely of the machine, said row containing two sets of bars carrying different characters, a delivery-shaft for releasing each set of bars, the delivery-shafts of each set passing respectively to opposite sides of the machine, a carriage for said shafts, part of said carriage being on each side of the machine, mechanism for moving the carriage transversely of the machine, electro-magnets mounted on the carriage, and circuit-connections controlling the electro-magnets for operating the delivery-shafts, substantially as described.

6. In a machine of the class referred to, the combination of type or justifying bars, delivery-shafts, a balanced carriage for said delivery-shafts, electro-magnets mounted on said carriage for operating the delivery-shafts, some of said electro-magnets being on each side of the carriage, and mechanism for moving said carriage laterally, substantially as described.

7. In a machine of the class referred to, the combination of the type or justifiers, bars to which they are attached, said bars being arranged in rows, a movable carriage having bearings on both sides of said bars, a set of keys carried on a fixed part of the machine, and mechanism connected with the keys and moving with the carriage for releasing the bars of selected type or justifiers, substantially as described.

8. In a machine of the class referred to, the combination of the type or justifiers, bars to which they are attached, said bars being arranged in rows, a movable carriage having bearings on both sides of said bars, a delivery-shaft on the carriage for each row of bars, a set of keys, and mechanism connecting the keys and the delivery-shafts for effecting the release of selected type or justifiers, substantially as described.

9. In a machine of the class referred to, the combination of the type and a type-bar for each type, said type-bars being independently supported and actuated, means for assembling the type in line, justifying-wedges attached to reciprocating bars, mechanism for causing said bars to reciprocate in the direction of their length to and from the line of type, mechanism for advancing the justifying-wedges to effect justification, a power-shaft, and connections between the power-shaft and the justifying mechanism, whereby the latter is operated automatically and at recurring intervals, substantially as described.

10. In a machine of the class referred to, the combination of the type and a type-bar for each type, said type-bars being independently supported and actuated, means for assembling the type in line, justifying-wedges attached to reciprocating bars, wedge-plates, mechanism for causing said bars to reciprocate in the direction of their length to and from the line of type, mechanism for advancing the justifying-wedges to effect justification, a power-shaft, and connections between the power-shaft and the justifying mechanism, whereby the latter is operated automatically and at recurring intervals, substantially as described.

11. In a machine of the class referred to, the combination of the type, a type-bar for each type, said type-bars being independently supported and actuated, means for assembling the type in line, justifying-wedges, means for causing the justifying-wedges to assume their proper positions in the line of type, mechanism for causing the advance of the justifying-wedges between the type to effect the justification, and other mechanism for producing the matrix, said justifying and matrix-making mechanism being connected with the shafting of the machine, so that they are actuated automatically and at recurring intervals, substantially as described.

12. In a machine of the class referred to, the combination of type, a type-bar for each type, said type-bars being independently supported and actuated, means for assembling the type in line, justifying-wedges, means for causing the justifying-wedges to assume their proper positions in the line of type, mechanism for causing the advance of the justifying-wedges between the type to effect the justification, mechanism for locking the justified line of type, and other mechanism for producing the matrix, said justifying, locking, and matrix-making mechanism being all connected with the shafting of the machine, so that they are actuated automatically and at recurring intervals, substantially as described.

13. In a machine of the class referred to, the combination of the type, a type-bar for each type, said type-bars being independently supported and actuated, means for assembling the type in line, justifying-wedges and wedge-plates, means for causing the justifying-wedges and wedge-plates to assume their proper positions in the line of type, mechanism for causing the simultaneous advance of the justifying-wedges between the type to effect the justification, mechanism for locking the justified line of type, and other mechanism for producing the matrix, said justifying, locking, and matrix-making mechanism being all connected with the shafting of the machine, so that they are actuated automatically and at recurring intervals, substantially as described.

14. In a machine of the class referred to, the combination of the type and a type-bar for each type, said type-bars being independently supported and actuated, means for assembling the type in line, justifying-wedges, means for causing the justifying-wedges to assume their proper positions in the line of type, a thrust-plate for causing the advance of the justifying-wedges between the type to effect the justification, mechanism for locking the justified line of type, and other mechanism for producing the matrix, said thrust-plate, locking, and matrix-making mechanism being all connected with the shafting of the machine, so that they are actuated automatically and at recurring intervals, substantially as described.

15. In a machine of the class referred to, the combination of the type and a type-bar for each type, said type-bars being independently supported and actuated, means for assembling the type in line, justifying-wedges, means for causing the justifying-wedges to assume their proper positions in the line of type, mechanism for causing the advance of the justifying-wedges between the type to effect the justification, mechanism for locking the justified line of type, mechanism for producing an impression upon a matrix-blank, and mechanism for feeding the matrix-blanks to and from the position in which they are impressed, said justifying, locking, impressing, and feeding mechanism being all connected with the shafting of the machine, so that they are actuated automatically and at recurring intervals, substantially as described.

16. In a machine of the class referred to, the combination of the type and a type-bar for each type, said type-bars being independently supported and actuated, means for assembling the type in line, justifying-wedges and wedge-plates, bars to which the justifying-wedges are attached, guideways in which the bars slide longitudinally, a rest-bar, mechanism for causing the bars to advance until the wedge-plates rest upon the rest-bar, mechanism for causing the advance of the justifying-wedges between the type to effect the justification, mechanism for locking the justified line of type, and mechanism for producing a matrix, said justifying, locking, and matrix-making mechanism being all connected with the shafting of the machine, so that they are actuated automatically and at recurring intervals, substantially as described.

17. In a machine of the class referred to, the combination of the type and a type-bar for each type, said type-bars being independently supported and actuated, means for assembling the type in line, mechanism for locking the assembled type, the impression-table 111, the power-shafting, and connections between the power-shafting and the locking mechanism and impression-table for causing the locking of the type and the impression movement of the table automatically and at recurring intervals, substantially as described.

18. In a machine of the class referred to, the combination of the type and a type-bar for each type, said type-bars being independently supported and actuated, means for assembling and locking the type in line, an impression-table, a normally-rotating power-shaft from which other parts of the machine are driven, and connections between the table and the shaft whereby the former is automatically advanced at recurring intervals as the shaft revolves, substantially as described.

19. An organized machine of the class described, containing, in combination, type and a type-bar for each type, said type-bars being independently supported and actuated, mechanism for causing the type-bars to advance until the selected type are assembled in line, mechanism for justifying the assembled type, mechanism for locking them in position, mechanism for advancing the impression-table to produce the impression, and a power-shaft, said justifying, locking, and impression mechanism being so connected with the power-shaft as to be actuated at recurring intervals as the shaft revolves, substantially as described.

20. An organized machine of the class described, containing, in combination, type and a type-bar for each type, mechanism for causing the type-bars to advance longitudinally until the selected type are assembled in line, mechanism for justifying the assembled type, mechanism for locking them in position, mechanism for advancing the impression-table, mechanism for retracting the type-bars to distribute the type, and a power-shaft, said justifying, locking, impression, and distributing mechanism being connected with the power-shaft so as to be actuated at recurring intervals as the shaft revolves, substantially as described.

21. The combination of the impression-table 111, the lever 117, the swinging link 123, the power-shaft 118, and connections between the power-shaft and lever 117, substantially as described.

22. The combination of the crank arm and pin 128 127, cam 126, counter-balance 130, lever 117, provided with a swinging fulcrum, and table 111, substantially as described.

23. In a machine of the class referred to, the combination of type or justifiers, a bar for each type or justifier, to which the same are attached in a fixed position, guides in which the bars move longitudinally, mechanism for retracting the bars in order to distribute the type or justifiers, a power-shaft, and connections between the retracting mechanism and the shaft, whereby the type or justifiers are automatically distributed at a certain point in the revolution of the shaft, substantially as described.

24. In a machine of the class referred to, the combination of the type or justifiers and mechanism for assembling them in line, lifter-bars, and sliding lifter-bar carriers for effecting their distribution, a rock-shaft having arms on which the lifter-bar carriers are pivotally mounted, a power-shaft, and connections between the power-shaft and the rock-shaft, whereby the type or justifiers are automatically distributed at a certain point in the revolution of the power-shaft, substantially as described.

25. In a machine of the class referred to, the combination of a type or justifier, mechanism for causing the type or justifier to come to the composing-space, and a yielding gate engaged by the advancing type or justifier and operating to adjust the type in the composing-space, substantially as described.

26. In a machine of the class referred to, the combination of a type or justifier, mechanism for causing the type or justifier to come to the composing-space, a rest-bar for supporting the type in the impression position, and a yielding gate engaged by the advancing type or justifier and operating to adjust the type in the composing-space, substantially as described.

27. In a machine of the class referred to, the combination of a type or justifier, mechanism for causing the type or justifier to come to the composing-space, and a swinging gate engaged by the advancing type or justifier and operating to adjust the type in the composing-space, substantially as described.

28. In a machine of the class referred to, the combination of a type or justifier, mechanism for causing the type or justifier to come to the composing-space, and a swinging spring-gate engaged by the advancing type or justifier and operating to adjust the type in the composing-space, substantially as described.

29. In a machine of the class referred to, the combination of a justifier in two parts, mechanism for causing it to come to the composing-space, mechanism for causing one of the parts to move with reference to the other to effect justification, and a yielding gate engaged by the justifier as it comes to the composing-space and operating to adjust the entire justifier while permitting movement of one of the parts thereof, substantially as described.

30. In a machine of the class referred to, the combination of a justifier in two parts, mechanism for causing it to come to the composing-space, mechanism for causing one of the parts to move with reference to the other to effect justification, and a swinging gate engaged by the justifier as it comes to the composing-space and operating to adjust the entire justifier while permitting movement of one of the parts thereof, substantially as described.

31. In a machine of the class referred to, the combination of a justifier in two parts, mechanism for causing it to come to the composing-space, mechanism for causing one of the parts to move with reference to the other to effect justification, and a swinging spring-gate engaged by the justifier as it comes to the composing-space and operating to adjust the entire justifier while permitting movement of one of the parts thereof, substantially as described.

32. The combination of means for assembling a line of type in position to make an impression, mechanism for producing a matrix bearing the impression of the type, and means for casting a printing-bar from the matrix, substantially as described.

33. The combination of means for assembling a line of type in position to make an impression, mechanism for producing a matrix bearing the impression of the type, means for casting a printing-bar from the matrix, and mechanism for transferring the completed matrix to the casting mechanism, substantially as described.

34. The combination of means for assembling a line of type in position to make an impression upon a matrix, a series of impressionable matrix-blanks, and means for casting printing-bars from the impressed matrices, substantially as described.

35. The combination of an assembled line of type, an impressionable matrix-blank, mechanism for presenting the matrix-blank to the type to receive an impression therefrom, means for casting a printing-bar from the impressed matrix, and mechanism for transferring the matrix from the impression mechanism to the casting mechanism, substantially as described.

36. The combination of mechanism for impressing a matrix, mechanism for casting a printing-bar therefrom, and mechanism for transferring the matrix from the matrix-making to the casting mechanism, substantially as described.

37. The combination of mechanism for impressing a matrix, mechanism for casting a printing-bar therefrom, a runway, a line of matrix-blocks, and a plunger for forcing the blocks through the runway, substantially as described.

38. An organized machine of the class described, containing, in combination, type and mechanism for assembling them in line, mechanism for justifying the type, mechanism for locking them in position, mechanism for advancing the impression-table to produce an impression upon a matrix-blank, a printing-bar-casting mechanism, mechanism for conveying the matrices from the impression-table to the casting mechanism, and a power-shaft, the locking mechanism, the impression mechanism, the conveying mechanism, and the casting mechanism being connected to the power-shaft so as to be actuated at recurring intervals as the shaft revolves, substantially as described.

39. An organized machine of the class described, containing, in combination, mechanism for composing a line of type and producing an impression upon a matrix-blank, mechanism for casting the printing-bars from the matrix, mechanism for conveying the matrix from the impression-table to the casting mechanism, and a power-shaft, the connections between the impression mechanism, the casting mechanism, and the conveying mechanism and the power-shaft being such that the said mechanisms are operated at recurring intervals to perform their functions, substantially as described.

40. An organized machine of the class described, containing, in combination, mechanism for assembling the line of type and taking an impression therefrom upon a matrix-blank, mechanism for casting printing-bars from the matrix, mechanism for conveying the matrices from the impression-table to the casting mechanism, mechanism for delivering the printing-bars in proper order to a galley, and a power-shaft, said impression mechanism, casting mechanism, conveying mechanism, and delivering mechanism being so connected to the power-shaft as to be actuated periodically thereby to perform their functions, substantially as described.

41. The combination, in a machine of the class referred to, of mechanism for preparing a matrix-block, mechanism for casting a printing-bar therefrom, a runway connecting said mechanisms, and mechanism for forcing a line of abutting matrix-blocks through said runway, substantially as described.

42. The combination, in a machine of the class referred to, of mechanism for preparing a matrix-block, mechanism for casting a printing-bar therefrom, a runway connecting said mechanisms, a line of abutting matrix-blocks in said runway, and mechanism for moving the entire line of blocks one step forward at recurring intervals in the operation of the machine, substantially as described.

43. In a machine of the class referred to, the combination of the type, mechanism for assembling and locking them in line, a movable impression-table by which the matrix-blank is carried against the type, and a runway for matrix-blanks, formed in part of the impression-table in one of its positions, substantially as described.

44. In a machine of the class referred to, the combination of the type, mechanism for assembling and locking them in line, a movable impression-table by which the matrix-blank is carried against the type, a runway for matrix-blanks formed in part of the impression-table in one of its positions, and a plunger for forcing the matrix-blanks through the runway to the impression-table, substantially as described.

45. In a machine of the class referred to, the combination of the type, mechanism for assembling and locking them in line, a movable impression-table by which the matrix-blank is carried against the type, a runway for the matrix-blanks formed in part of the impression-table in one of its positions, a plunger for forcing the matrix-blanks through the runway, a power-shaft, and connections between the power-shaft and the plunger for operating the latter, substantially as described.

46. An organized machine of the class described, containing, in combination, type, mechanism for assembling and locking the type in line, an impression-table, mechanism for casting printing-bars from matrices, a runway for the matrices formed in part of the impression table in one of its positions, and a plunger for forcing the matrices through the runway first to the impression-table and thence to the casting mechanism, substantially as described.

47. An organized machine of the class described, containing, in combination, type, mechanism for assembling and locking the type in line, an impression-table capable of being moved from its normal position to a position where it presents a blank to the line of type to produce a matrix, mechanism for casting printing-bars from the matrix, a holder for receiving the matrix-block and presenting it to the casting-mold, a runway formed in part of the impression-table and holder in their normal positions, and a plunger for forcing the matrix blanks and blocks in a continuous line through the runway, substantially as described.

48. In a machine of the class referred to, the combination of mechanism for preparing a matrix, mechanism for casting a printing-bar therefrom, a runway through which the matrix passes from the forming to the casting mechanism, and a rotary reciprocating holder in one of its positions forming part of the runway, substantially as described.

49. In a machine of the class referred to, the combination, with a runway for the matrix, of a holder having a rotary reciprocating motion, forming in one position a part of said runway and in another position presenting the matrix to the printing-bar mold, substantially as described.

50. In a machine of the class referred to, the combination of mechanism for preparing a matrix, mechanism for casting a printing-bar therefrom, a continuous runway for the matrices passing from the point where they are prepared to the point where they are delivered from the machine, and a reciprocating holder forming in one of its positions a part of said continuous runway and in the other presenting a matrix to the casting mechanism, substantially as described.

51. In a machine of the class referred to, the combination of mechanism for preparing a matrix-block, mechanism for casting a printing-bar therefrom, a continuous runway for matrix-blocks passing from the point where they are prepared to the point where they are delivered from the machine, a reciprocating holder forming in one of its positions a part of said continuous runway, in the other presenting the block to the casting mechanism, and a plunger for forcing the blocks through the runway, substantially as described.

52. In a machine of the class referred to, the combination of a casting mechanism, a continuous runway for matrix-blocks passing from the point where the blocks are introduced into the machine to the point where they are delivered therefrom, a reciprocating holder forming in one of its positions part of said runway and in its other position presenting the block to the casting mechanism, a line of abutting blocks extending throughout said runway, and mechanism for forcing the blocks through said runway, substantially as described.

53. In a machine of the class referred to, the combination of a line of abutting matrix blanks or blocks, mechanism for moving the line step by step through the machine, and mechanism for removing a blank or block out of line and returning it to the line between two successive movements of the line, whereby the blank or block may be more conveniently operated upon than in the line, substantially as described.

54. In a machine of the class referred to, the combination of a casting mechanism and a holder for the matrix while the operation of casting is in progress, said holder being provided with a spring arranged to bear upon the matrix, whereby the holder is adapted to matrices varying in size, substantially as described.

55. In an organized machine, the combination of a rotary reciprocating matrix-holder, a reciprocating mold-plate, a reciprocating casting mechanism, a power-shaft, and connections between each of the said reciprocating parts and the power-shaft, whereby they are brought into conjunction and pressed together periodically in the revolution of the shaft, substantially as described.

56. The combination of a printing-bar-casting mechanism, a galley for receiving the printing-bars, and a series of pivoted leaves successively receiving and acting upon the bars for delivering the latter from the casting mechanism to the galley, substantially as described.

57. The combination of the printing-bar-casting mechanism, the incline 210, pivoted leaves 221 223, and the galley 224, substantially as described.

58. The combination of the pivoted leaf 221, receiving the printing-bars, pivoted leaf 223, the galley 224, and connections for operating said pivoted leaves, substantially as described.

59. The combination of the receiver 213, the plate 215, against which the matrix-blocks are successively delivered, the stop 220, and means for withdrawing the plate periodically to allow a block to pass forward, substantially as described.

60. The combination of the matrix-holder 89, the receiver 213, the spring-plate 215, the stop 220, and connections for operating the spring-plate, substantially as described.

61. The combination of the receiver 213, plate 215, the spring-catch 216, the stop 220, and the pin 219, substantially as described.

62. In a machine of the class referred to, the combination of a continuous runway for matrix-blocks from the point where they enter the machine to the point where they are delivered, the plunger for forcing the blocks through said runway, the movable holder 89, forming in one of its positions a part of said runway, and the delivery-pipe 214 for receiving the blocks when ejected from the holder, substantially as described.

In testimony whereof we have hereunto set our hands in the presence of two subscribing witnesses.

HOMER LEE.
E. LEBRUN.

Witnesses:
J. J. KENNEDY,
JOHN E. NYE.